United States Patent
Shimizu et al.

(10) Patent No.: US 8,255,128 B2
(45) Date of Patent: Aug. 28, 2012

(54) CONTROL DEVICE FOR AUTOMATIC TRANSMISSION

(75) Inventors: Tetsuya Shimizu, Anjo (JP); Masamichi Yamaguchi, Anjo (JP); Satoshi Nishio, Hekinan (JP); Kenichi Tsuchida, Anjo (JP); Akitomo Suzuki, Anjo (JP); Kazunori Ishikawa, Anjo (JP); Shin-ichirou Murakami, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 842 days.

(21) Appl. No.: 12/314,814

(22) Filed: Dec. 17, 2008

(65) Prior Publication Data

US 2009/0171545 A1 Jul. 2, 2009

(30) Foreign Application Priority Data

Dec. 27, 2007 (JP) .................................. 2007-338146

(51) Int. Cl.
*G06F 7/00* (2006.01)

(52) U.S. Cl. ................ 701/51; 701/61; 477/49; 477/80; 477/95; 475/116; 475/120; 475/121; 475/122; 475/123

(58) Field of Classification Search .................... 701/60, 701/51; 477/95, 49, 80; 475/120–123, 116, 475/269
See application file for complete search history.

(56) References Cited

U.S. PATENT DOCUMENTS

| | | | | |
|---|---|---|---|---|
| 6,508,741 B1* | 1/2003 | Murakami et al. | ............... | 477/95 |
| 7,500,932 B2* | 3/2009 | Katakura et al. | ............... | 475/123 |
| 7,891,263 B2* | 2/2011 | Mowbray et al. | ............... | 74/340 |
| 2001/0054520 A1* | 12/2001 | Hosomi et al. | ............... | 180/197 |
| 2005/0003921 A1* | 1/2005 | Morise et al. | ............... | 475/116 |
| 2006/0122031 A1* | 6/2006 | Preisner et al. | ............... | 477/80 |
| 2006/0142111 A1* | 6/2006 | Park | ............... | 475/269 |
| 2006/0219051 A1* | 10/2006 | Mae et al. | ............... | 74/606 R |
| 2006/0252593 A1* | 11/2006 | Inoue et al. | ............... | 475/116 |

FOREIGN PATENT DOCUMENTS

| | | |
|---|---|---|
| JP | A-8-42681 | 2/1996 |
| JP | A-10-009377 | 1/1998 |
| JP | 2000335269 A * | 12/2000 |
| JP | A-2001-248723 | 9/2001 |
| JP | A-2003-336731 | 11/2003 |

* cited by examiner

*Primary Examiner* — Redhwan K Mawari
(74) *Attorney, Agent, or Firm* — Oliff & Berridge, PLC

(57) ABSTRACT

An exemplary control device includes an input torque detection unit that detects an input torque input to the input shaft; and a controller that: determines torque distribution of two of the friction engagement elements that form the shift speeds; and calculates a transmission torque of the two friction engagement elements based on the input torque and the torque distribution and sets the engagement pressure to obtain a torque capacity that can transmit the transmission torque, wherein the controller sets the engagement pressure such that slippage does not occur in the two friction engagement elements in a state where engagement of the two friction engagement elements forms the shift speeds and such that, even if an additional friction engagement element engages based on the line pressure while the two friction engagement elements are engaged, one of the three friction engagement elements is caused to slip.

19 Claims, 8 Drawing Sheets

FIG. 3

|   | C-1 | C-2 | C-3 | B-1 | B-2 | F-1 |
|---|---|---|---|---|---|---|
| P |   |   |   |   |   |   |
| REV |   |   | O |   | O |   |
| N |   |   |   |   |   |   |
| 1ST | O |   |   |   | (O) | O |
| 2ND | O |   |   | O |   |   |
| 3RD | O |   | O |   |   |   |
| 4TH | O | O |   |   |   |   |
| 5TH |   | O | O |   |   |   |
| 6TH |   | O |   | O |   |   |

※(O) ENGINE BRAKE IN OPERATION

F I G . 4
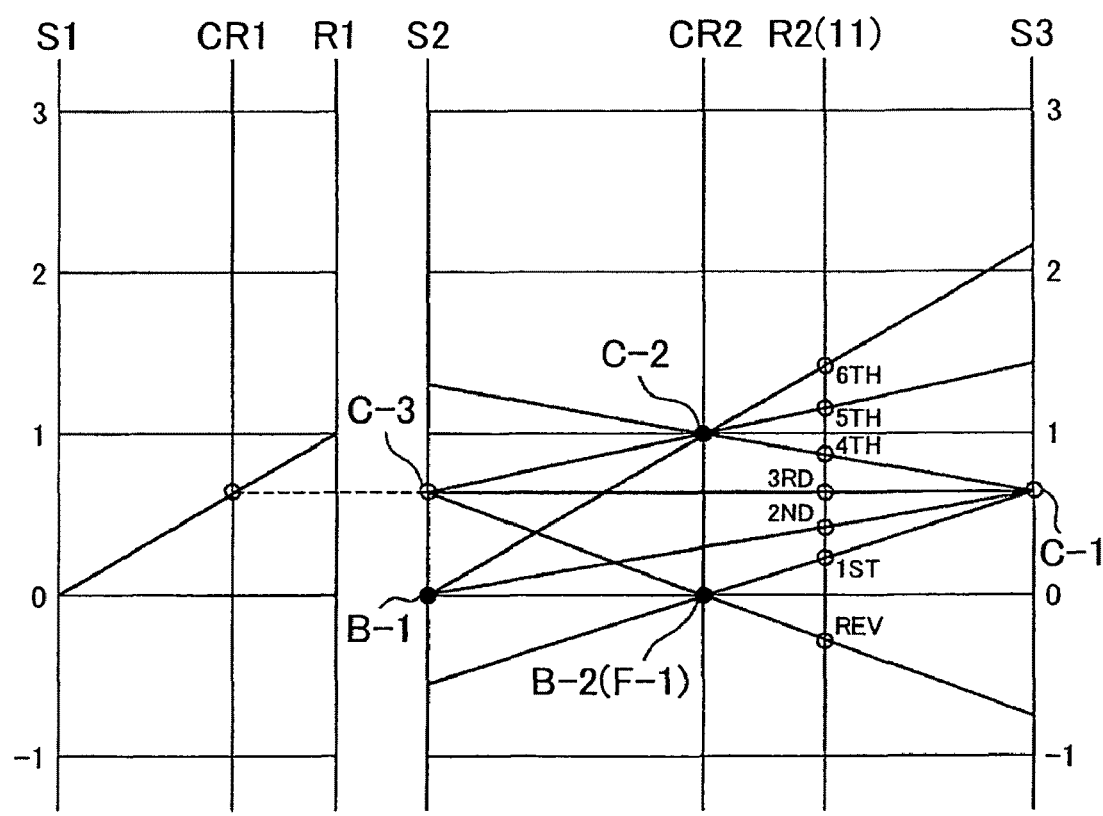

CONTROL DEVICE FOR AUTOMATIC TRANSMISSION

INCORPORATION BY REFERENCE

The disclosure of Japanese Patent Application No. 2007-338146 filed on Dec. 27, 2007 including the specification, drawings and abstract is incorporated herein by reference in its entirety.

BACKGROUND

The present invention relates to a control device, method and storage medium for an automatic transmission.

There exists a multi-stage automatic transmission mounted on a vehicle or the like. Hydraulic control is performed to engage a plurality of (for example, two) friction engagement elements (clutch or brake) according to a shift speed in order to form a transmission path of a speed change gear mechanism. However, for example, when a hydraulic pressure is output due to a failure (disconnection, or valve sticking, for example) of a linear solenoid valve to a hydraulic servo as a friction engagement element which should be released, there is a possibility that the friction engagement element which should be released is simultaneously engaged in addition to the friction engagement element engaged in a normal state.

Thus, in order to prevent the simultaneous engagement, a configuration has been proposed in which a plurality of so-called cut-off valves which block a hydraulic pressure (source pressure) of an additional friction engagement element when an engagement pressure of friction engagement elements engaged in the normal state is input are provided according to the combination of the friction engagement elements to be engaged in each shift speed to thereby prevent the simultaneous engagement in all shift speeds (for example, see Japanese Patent Application Publication No. JP-A-2003-336731).

SUMMARY

In recent years, improvements in fuel efficiency of vehicles are required due to environmental issues and the like. For example, multi-speed automatic transmissions are required also for small vehicles. Therefore, a number of friction engagement elements for forming shift speeds become necessary even for the automatic transmissions for which size reduction is required. However, when the cut-off valve prevents the simultaneous engagement, there has been a problem in that the number of the necessary cut-off valves increases according to the increase in shift speeds to not only inhibit the reduction in size of a hydraulic control device but also inhibit the reduction in weight and cost.

Thus, it is an object of the present invention to provide a control device for an automatic transmission which can prevent a simultaneous engagement without using a cut-off valve to reduce the size, weight, and cost. The present invention can also achieve various other advantages.

An exemplary control device for an automatic transmission that includes an automatic speed change mechanism with an input shaft connected to a driving source and an output shaft connected to a drive wheel and a plurality of friction engagement elements engaged based on an engagement pressure supplied to each hydraulic servo, in which a transmission path between the input shaft and the output shaft is changed based on engaged states of two of the plurality of friction engagement elements to form a plurality of shift speeds; and a regulated pressure supply portion that can freely regulate a line pressure to be supplied as the engagement pressure individually to each of the hydraulic servos, and which selectively engages the friction engagement elements in accordance with the shift speeds, the control device includes an input torque detection unit that detects an input torque input to the input shaft; and a controller that: determines torque distribution of two friction engagement elements that form the shift speeds; and calculates a transmission torque of the two friction engagement elements based on the input torque and the torque distribution and sets the engagement pressure to obtain a torque capacity that can transmit the transmission torque, wherein the controller sets the engagement pressure such that slippage does not occur in the two friction engagement elements in a state where engagement of the two friction engagement elements forms the shift speeds and such that, even if an additional friction engagement element engages based on the line pressure while the two friction engagement elements are engaged, one of the three friction engagement elements is caused to slip.

An exemplary method of operating an automatic transmission that includes an automatic speed change mechanism with an input shaft connected to a driving source and an output shaft connected to a drive wheel and a plurality of friction engagement elements engaged based on an engagement pressure supplied to each hydraulic servo, in which a transmission path between the input shaft and the output shaft is changed based on engaged states of two of the plurality of friction engagement elements to form a plurality of shift speeds; and a regulated pressure supply portion that can freely regulate a line pressure to be supplied as the engagement pressure individually to each of the hydraulic servos, and that selectively engages the friction engagement elements in accordance with the shift speeds, the method includes detecting an input torque input to the input shaft with a detector; determining torque distribution of two friction engagement elements that form the shift speeds with a controller; and calculating a transmission torque of the two friction engagement elements based on the input torque and the torque distribution and sets the engagement pressure to obtain a torque capacity that can transmit the transmission torque with a controller, wherein the engagement pressure is set such that slippage does not occur in the two friction engagement elements in a state where engagement of the two friction engagement elements forms the shift speeds and such that, even if an additional friction engagement element engages based on the line pressure while the two friction engagement elements are engaged, one of the three friction engagement elements is caused to slip.

An exemplary computer readable storage medium storing a set of program instructions for operating an automatic transmission that includes an automatic speed change mechanism with an input shaft connected to a driving source and an output shaft connected to a drive wheel and a plurality of friction engagement elements engaged based on an engagement pressure supplied to each hydraulic servo, in which a transmission path between the input shaft and the output shaft is changed based on engaged states of two of the plurality of friction engagement elements to form a plurality of shift speeds; and a regulated pressure supply portion that can freely regulate a line pressure to be supplied as the engagement pressure individually to each of the hydraulic servos, and which selectively engages the friction engagement elements in accordance with the shift speeds, the program including instructions for: detecting an input torque input to the input shaft; determining torque distribution of two friction engagement elements that form the shift speeds; and calculating a transmission torque of the two friction engagement elements based on the input torque and the torque distribution and sets the engagement pressure to obtain a torque capacity that can transmit the transmission torque, wherein the engagement pressure is set such that slippage does not occur in the two friction engagement elements in a state where engagement of the two friction engagement elements forms the shift speeds and such that, even if an additional friction engagement element engages based on the line pressure while the two friction engagement elements are engaged, one of the three friction engagement elements is caused to slip.

BRIEF DESCRIPTION OF THE DRAWINGS

Various exemplary aspects of the invention will be described with reference to the drawings, wherein:

FIG. 3 is an engagement table of an automatic speed change mechanism;

FIG. 4 is a velocity diagram of the automatic speed change mechanism;

DETAILED DESCRIPTION OF EMBODIMENTS

Figure 1:
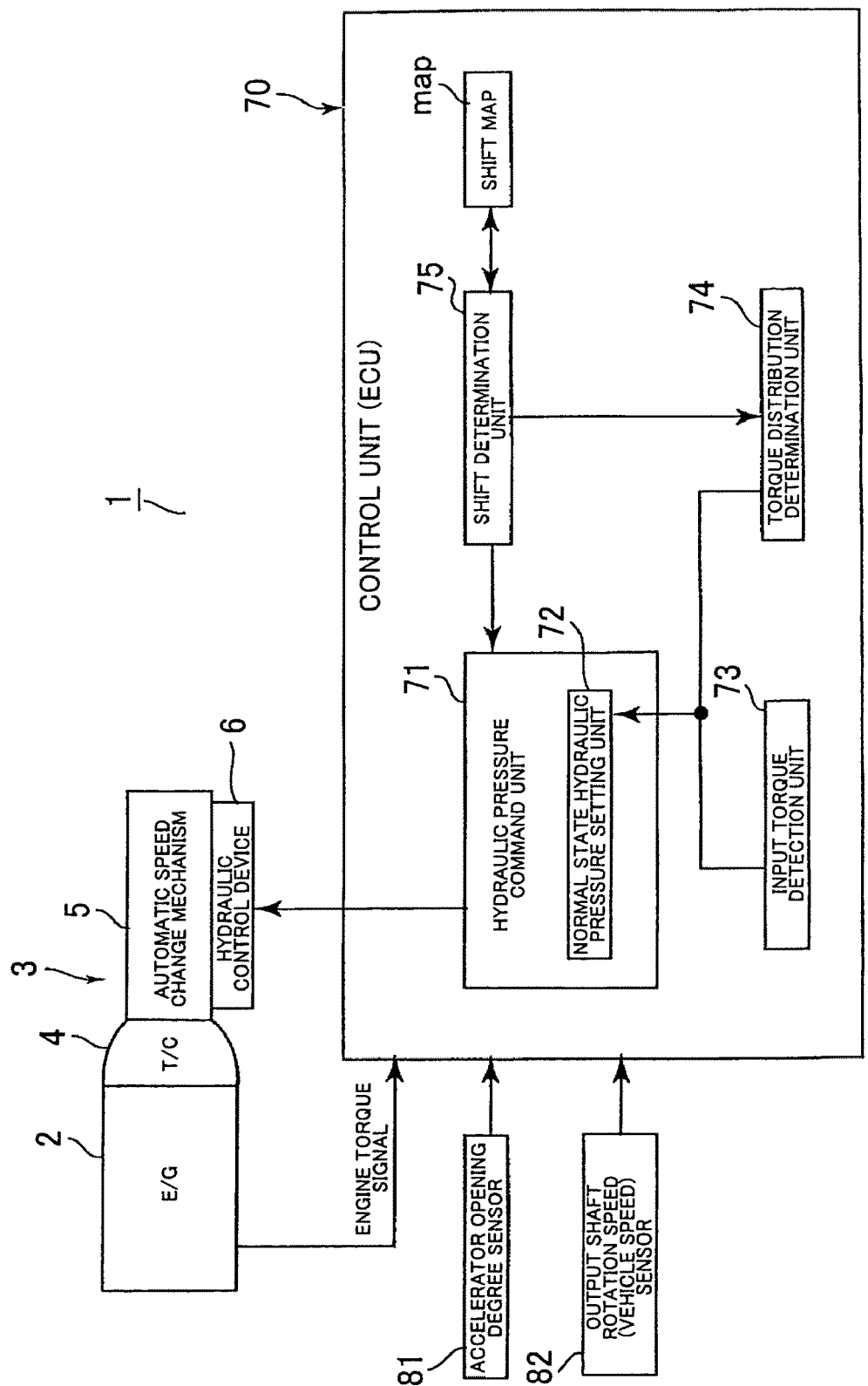
FIG. 1 is a block diagram showing a control device for an automatic transmission according to the present invention.

Hereinafter, an embodiment of the present invention will be described with reference to FIGS. 1 to 8B.

[Schematic Configuration of Automatic Transmission]

First, the schematic configuration of an automatic transmission 3 to which the present invention can be applied will be described with reference to FIG. 2. For example, as shown in FIG. 2, the automatic transmission 3 suitable for use in a front-engine front-wheel drive (FF) vehicle has an input shaft 8 of the automatic transmission connectable to an engine (driving source) 2 (see FIG. 1), and includes a torque converter 4 and an automatic speed change mechanism 5 with the axis of the input shaft 8 as the center.

The torque converter 4 has a pump impeller 4a connected to the input shaft 8 of the automatic transmission 3, and a turbine runner 4b to which the rotation of the pump impeller 4a is transmitted via a working fluid. The turbine runner 4b is connected to an input shaft 10 of the automatic speed change mechanism 5 arranged coaxially with the input shaft 8. The torque converter 4 includes a lockup clutch 7. When the lockup clutch 7 is engaged, the rotation of the input shaft 8 of the automatic transmission 3 is directly transmitted to the input shaft 10 of the automatic speed change mechanism 5.

The automatic speed change mechanism 5 includes a planetary gear (deceleration planetary gear) SP and a planetary gear unit (planetary gear set) PU on the input shaft 10. The planetary gear SP is a so-called single pinion planetary gear including a sun gear S1, a carrier CR1, and a ring gear R1, and having a pinion P1 that meshes with the sun gear S1 and the ring gear R1 in the carrier CR1.

The planetary gear unit PU is a so-called Ravigneaux-type planetary gear having a sun gear (third rotational element) S2, a sun gear (first rotational element) S3, a carrier (second rotational element) CR2, and a ring gear (fourth rotational element) R2 as four rotational elements, and having a long pinion PL which meshes with the sun gear S2 and the ring gear R2 and a short pinion PS which meshes with the sun gear S3 to mesh with each other in the carrier CR2.

The sun gear S1 of the planetary gear SP is connected to a boss portion fixed integrally with a transmission case 9 such that the rotation is stopped. The ring gear R1 is subjected to the same rotation (hereinafter called "input rotation") as the rotation of the input shaft 10. Further, the carrier CR1 is subjected to decelerated rotation decelerated from the input rotation by the fixed sun gear S1 and the ring gear R1 subjected to the input rotation, and is connected to a clutch (first clutch as a friction engagement element) C-1 and a clutch (third clutch as a friction engagement element) C-3.

The sun gear S2 of the planetary gear unit PU is connected to a brake (first brake as a friction engagement element) B-1 formed of a band brake to be fixable with respect to the transmission case, and is connected to the clutch C-3 such that the decelerated rotation of the carrier CR1 can be input via the clutch C-3. The sun gear S3 is connected to the clutch C-1 such that the decelerated rotation of the carrier CR1 can be input. Note that the brake B-1 has a brake band 19 provided around a drum-shaped member 18 connected to the clutch C-3 and the sun gear S2. The brake band 19 has one end fixed to the case 9 and the other end drive-connected to a hydraulic servo 44 described later (see FIG. 5), so as to be wound around the drum-shaped member 18 by driving the hydraulic servo 44. The winding direction of the brake band 19 is arranged to be in the opposite direction of the rotational direction of the drum-shaped member 18 in a second forward speed to a sixth forward speed. That is, the brake band 19 is pulled by the hydraulic servo 44 to be wound in the opposite direction with respect to the rotational direction of the drum-shaped member 18 in the second forward speed to the sixth forward speed.

Further, the carrier CR2 is connected to a clutch (second clutch as a friction engagement element) C-2 to which the rotation of the input shaft 10 is input such that the input rotation can be input via the clutch C-2. Also, the clutch C-2 is connected to a one-way clutch F-1 and a brake (second brake as a friction engagement element) B-2 such that rotation in one direction with respect to the transmission case is restricted via the one-way clutch F-1 and the rotation is stoppable via the brake B-2. The ring gear R2 is connected to a counter gear (output shaft) 11, and the counter gear 11 is connected to a drive wheel via a counter shaft and a differential device (not shown).

[Operation in Each Shift Speed in Automatic Transmission]

Next, based on the configuration described above, the application of the automatic speed change mechanism 5 will be described with reference to FIGS. 2, 3, and 4. Note that, in a velocity diagram shown in FIG. 4, the ordinate direction shows the rotational speeds of the respective rotational elements (respective gears), and the abscissa direction shows the gear ratios of the respective rotational element. In a portion of the planetary gear SP in the velocity diagram, the ordinates respectively correspond to the sun gear S1, the carrier CR1, and the ring gear R1 in order from the left side in FIG. 4. Further, in a portion of the planetary gear unit PU in the velocity diagram, the ordinates respectively correspond to the sun gear S3, the ring gear R2, the carrier CR2, and the sun gear S2 in order from the right side in FIG. 4.

For example, in a first (1ST) forward speed in a drive (D) range, the clutch C-1 and the one-way clutch F-1 are engaged, as shown in FIG. 3. As shown in FIGS. 2 and 4, the rotation of the carrier CR1 decelerated by the fixed sun gear S1 and the ring gear R1 subjected to the input rotation is input to the sun gear S3 via the clutch C-1. The rotation of the carrier CR2 is restricted to one direction (positive rotation direction), i.e., the carrier CR2 is prevented from a reverse rotation and fixed. The decelerated rotation input to the sun gear S3 is output to the ring gear R2 via the fixed carrier CR2, and the positive rotation as the first forward speed is output from the counter gear 11.

At the time of an engine braking (during coasting), the state of the first forward speed is maintained while the brake B-2 is locked to fix the carrier CR2 such that the positive rotation of the carrier CR2 is prevented. In the first forward speed, since the one-way clutch F-1 prevents the reverse rotation and allows the positive rotation of the carrier CR2, the first forward speed when switched from a non-drive range to the drive range, for example, can be achieved smoothly by the automatic engagement of the one-way clutch F-1.

In the second (2ND) forward speed, the clutch C-1 is engaged and the brake B-1 is locked, as shown in FIG. 3. As shown in FIGS. 2 and 4, the rotation of the carrier CR1 decelerated by the fixed sun gear S1 and the ring gear R1 subjected to the input rotation is input to the sun gear S3 via the clutch C-1. The locking of the brake B-1 stops the rotation of the sun gear S2. The carrier CR2 is subjected to the decelerated rotation lower than that of the sun gear S3, the decelerated rotation input to the sun gear S3 is output to the ring gear R2 via the carrier CR2, and a positive rotation as the second forward speed is output from the counter gear 11.

In the third (3RD) forward speed, the clutch C-1 and the clutch C-3 are engaged, as shown in FIG. 3. As shown in FIGS. 2 and 4, the rotation of the carrier CR1 decelerated by the fixed sun gear S1 and the ring gear R1 subjected to the input rotation is input to the sun gear S3 via the clutch C-1. The decelerated rotation of the carrier CR1 is input to the sun gear S2 by the engagement of the clutch C-3. That is, since the decelerated rotation of the carrier CR1 is input to the sun gear S2 and the sun gear S3, the planetary gear unit PU is brought to a directly-connected state in the decelerated rotation, such that the decelerated rotation is directly output to the ring gear R2 and a positive rotation as the third forward speed is output to the counter gear 11.

In the fourth (4TH) forward speed, the clutch C-1 and the clutch C-2 are engaged, as shown in FIG. 3. As shown in FIGS. 2 and 4, the rotation of the carrier CR1 decelerated by the fixed sun gear S1 and the ring gear R1 subjected to the input rotation is input to the sun gear S3 via the clutch C-1. The input rotation is input to the carrier CR2 by the engagement of the clutch C-2. By the decelerated rotation input to the sun gear S3 and the input rotation input to the carrier CR2, a decelerated rotation higher than that in the third forward speed is output to the ring gear R2, and a positive rotation as the fourth forward speed is output from the counter gear 11.

In the fifth (5TH) forward speed, the clutch C-2 and the clutch C-3 are engaged, as shown in FIG. 3. As shown in FIGS. 2 and 4, the rotation of the carrier CR1 decelerated by the fixed sun gear S1 and the ring gear R1 subjected to the input rotation is input to the sun gear S2 via the clutch C-3. The input rotation is input to the carrier CR2 by the engagement of the clutch C-2. By the decelerated rotation input to the sun gear S2 and the input rotation input to the carrier CR2, an increased rotation slightly higher than the input rotation is output to the ring gear R2, and a positive rotation as the fifth forward speed is output from the counter gear 11.

In the sixth (6TH) forward speed, the clutch C-2 is engaged and the brake B-1 is locked, as shown in FIG. 3. As shown in FIGS. 2 and 4, the input rotation is input to the carrier CR2 by the engagement of the clutch C-2. The locking of the brake B-1 stops the rotation of the sun gear S2. Due to the fixed sun gear S2, the input rotation of the carrier CR2 becomes an increased rotation higher than that in the fifth forward speed to be output to the ring gear R2, and a positive rotation as the sixth forward speed is output from the counter gear 11.

In the first reverse speed (REV), the clutch C-3 is engaged and the brake B-2 is locked, as shown in FIG. 3. As shown in FIGS. 2 and 4, the rotation of the carrier CR1 decelerated by the fixed sun gear S1 and the ring gear R1 subjected the input rotation is input to the sun gear S2 via the clutch C-3. The locking of the brake B-2 stops the rotation of the carrier CR2. The decelerated rotation input to the sun gear S2 is output to the ring gear R2 via the fixed carrier CR2, and a reverse rotation as the first reverse speed is output from the counter gear 11.

Note that the clutch C-1, the clutch C-2, and the clutch C-3 are released in a parking (P) range and a neutral (N) range, for example. The carrier CR1 and the sun gear S2 as well as the sun gear S3, i.e., the planetary gear SP and the planetary gear unit PU, are brought to a disconnected state, and the input shaft 10 and the carrier CR2 are brought to a disconnected state. Accordingly, the input shaft 10 and the planetary gear unit PU are brought to a disconnected state regarding power transmission, and the input shaft 10 and the counter gear 11 are brought to a disconnected state regarding power transmission.

[Schematic Configuration of Hydraulic Control Device]

Next, a hydraulic control device 6 for the automatic transmission according to the present invention will be described. First, portions (not shown) for generating a line pressure, secondary pressure, modulator pressure, range pressure, and the like in the hydraulic control device 6 will be described roughly. Note that the portions for generating the line pressure, secondary pressure, modulator pressure, and range pressure are similar to those of a general hydraulic control device for an automatic transmission and well-known, and therefore will be described briefly.

For example, the hydraulic control device 6 includes an oil pump, a manual shift valve, a primary regulator valve, a secondary regulator valve, a solenoid modulator valve, a linear solenoid valve, and the like (not shown). For example, when the engine is started, the oil pump connected to be rotationally driven by the pump impeller 4a of the torque converter 4 is driven in combination with the rotation of the engine to generate a hydraulic pressure such that oil is sucked up from an oil pan (not shown) via a strainer.

The hydraulic pressure generated by the oil pump is regulated to a line pressure $P_L$ while the discharge is regulated by the primary regulator valve based on a signal pressure $P_{SLT}$ of the linear solenoid valve, which is regulated and output according to the opening degree of a throttle. The line pressure $P_L$ is supplied to the manual shift valve, the solenoid modulator valve, and more specifically to a linear solenoid valve SLC3 and the like described later. The line pressure $P_L$ supplied to the solenoid modulator valve is regulated to a modulator pressure $P_{MOD}$ that is approximately a constant pressure by the valve. The modulator pressure $P_{MOD}$ is supplied as a source pressure of the linear solenoid valve, and more specifically of solenoid valves S11, S12, and the like described later.

Note that the pressure discharged from the primary regulator valve is regulated to a secondary pressure $P_{SEC}$ while the discharge is further regulated by the secondary regulator valve, for example. The secondary pressure $P_{SEC}$ is supplied to, for example, a lubricating oil path and an oil cooler, and is also supplied to the torque converter 4, and is used for control of the lockup clutch 7.

The manual shift valve (not shown) has a spool driven mechanically (or electrically) by a shift lever provided to a driver's seat (not shown). By switching the position of the spool according to a shift range (for example, P, R, N, or D) selected by the shift lever, an output state or a non-output state (drainage) of the input line pressure $P_L$ is set.

More specifically, when the shift lever is operated to the D range, an input port to which the line pressure $P_L$ is input and a forward range pressure output port are communicated based on the position of the spool, and the line pressure $P_L$ is output from the forward range pressure output port as a forward range pressure (D range pressure) $P_D$. When the shift lever is operated to the reverse (R) range, the input port and a reverse range pressure output port are communicated based on the position of the spool, and the line pressure $P_L$ is output from the reverse range pressure output port as a reverse range pressure (R range pressure) $P_{REV}$. When the shift lever is operated to the P range or the N range, the input port and the forward range pressure output port as well as the reverse range pressure output port are disconnected by the spool, and the forward range pressure output port and the reverse range pressure output port are communicated with a drain port, i.e., are brought to non-output states where the D range pressure $P_D$ and the R range pressure $P_{REV}$ are drained (discharged).

[Detailed Configuration of Shift Controlling Portion of Hydraulic Control Device]

Next, portions for mainly performing a shift control in the hydraulic control device 6 according to the present invention will be described with reference to FIG. 5. Note that, in this embodiment, in order to describe the position of the spool, a position in the right half is called a "right half position" and a position in the left half is called a "left half position" in FIG. 5.

The hydraulic control device 6 is structured to include four linear solenoid valves SLC1, SLC2, SLC3, and SLB1 for directly supplying output pressures regulated as engagement pressures respectively to a total of five hydraulic servos of a hydraulic servo 41 of the clutch C-1, a hydraulic servo 42 of the clutch C-2, a hydraulic servo 43 of the clutch C-3, the hydraulic servo 44 of the brake B-1, and a hydraulic servo 45 of the brake B-2. The hydraulic control device 6 is also structured to include a solenoid valve S11, a solenoid valve S12, a first clutch apply relay valve 21, a second clutch apply relay valve 22, a C-2 relay valve (switching portion) 23, a B-2 relay valve 24, and the like as portions for achieving a limp-home function and switching the pressure output of the linear solenoid valve SLC2 to the hydraulic servo 42 of the clutch C-2 or the hydraulic servo 45 of the brake B-2.

Figure 5:
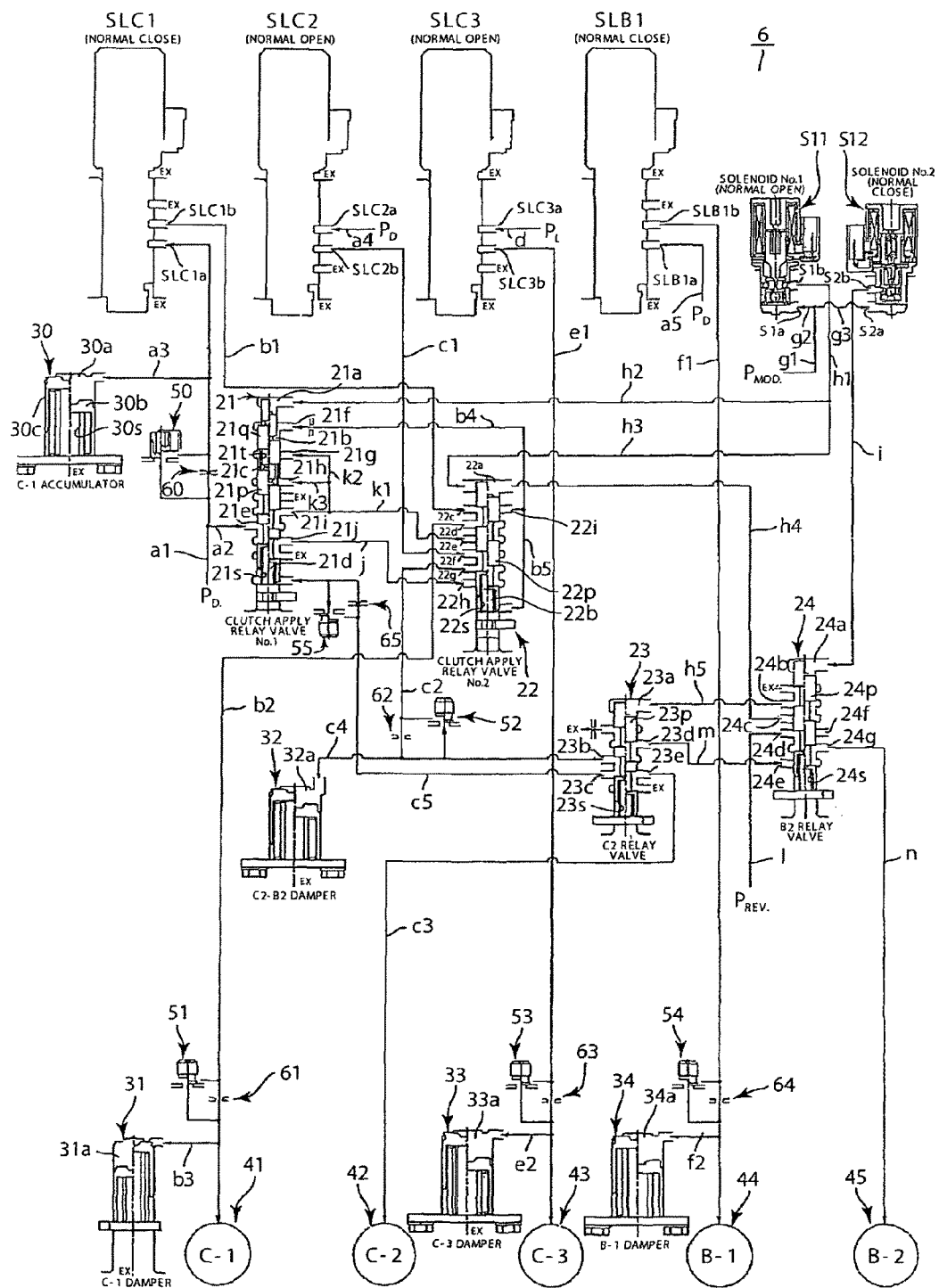
FIG. 5 is a circuit diagram showing a hydraulic control device for the automatic transmission.

An oil path a1, an oil path a4, and an oil path a5 shown in FIG. 5 are structured such that the forward range pressure output port (not shown) of the manual shift valve is connected thereto and the forward range pressure $P_D$ can be input thereto. Also, an oil path 1 is structured such that the reverse range pressure output port (not shown) of the manual shift valve is connected thereto and the reverse range pressure $P_{REV}$ can be input thereto. Further, the line pressure $P_L$ from the primary regulator valve (not shown) is input to an oil path d, and the modulator pressure $P_{MOD}$ from the modulator valve (not shown) is input to an oil path g1.

The oil path a1 is connected to an input port 21e of the first clutch apply relay valve 21 described later in detail via an oil path a2, and is arranged with a check valve 50 and an orifice 60. The oil path a1 is connected to an accumulator 30 via an oil path a3, and is connected to the linear solenoid valve SLC1. The accumulator 30 has a case 30c, a piston 30b arranged inside the case 30c, a spring 30s which biases the piston 30b, and an oil chamber 30a formed between the case 30c and the piston 30b.

The linear solenoid valve (first solenoid valve as a regulated pressure supply portion) SLC1 is a normally-closed type which is in the non-output state in the non-energized state, and has an input port SLC1a which inputs the forward range pressure $P_D$ via the oil path a1, and an output port SLC1b which regulates the forward range pressure $P_D$ and outputs a control pressure $P_{SLC1}$ as an engagement pressure $P_{C1}$ to the hydraulic servo 41. That is, the linear solenoid valve SLB1 is structured to disconnect the input port SLB1a and the output port SLB1b in the non-energized state to be in the non-output state, and to be capable of increasing the amount of communication (opening amount) between the input port SLC1a and the output port SLC1b in accordance with the command value, i.e., outputting the engagement pressure $P_{C1}$ in accordance with the command value, in the energized state based on the command value from a hydraulic pressure command unit 71 (see FIG. 1) of a control unit (ECU) 70 described later in detail. The output port SLC1b of the linear solenoid valve SLC1 is connected to an input port 22c of the second clutch apply relay valve 22 described later via an oil path b1.

The linear solenoid valve (second solenoid valve as a regulated pressure supply portion) SLC2 is a normally-opened type which is in the output state in the non-energized state, and has an input port SLC2a which inputs the forward range pressure $P_D$ via the oil path a4 and the like, and an output port SLC2b which regulates the forward range pressure $P_D$ and outputs a control pressure $P_{SLC2}$ as an engagement pressure $P_{C2}$ (or an engagement pressure $P_{B2}$) to the hydraulic servo 42. That is, the linear solenoid valve SLC2 is structured to be in the output state in which the input port SLC2a and the output port SLC2b are communicated in the non-energized state, and to be capable of decreasing the amount of communication (i.e., reducing the opening amount) between the input port SLC2a and the output port SLC2b in accordance with the command value, i.e., outputting the engagement pressure $P_{C2}$ (or $P_{B2}$) in accordance with the command value, in the energized state based on the command value from the hydraulic pressure command unit 71 of the control unit (ECU) 70 described later in detail. The output port SLC2b of the linear solenoid valve SLC2 is connected to an input port 22f of the second clutch apply relay valve 22 described later via an oil path c1.

The linear solenoid valve (third solenoid valve as a regulated pressure supply portion) SLC3 is a normally-opened type which is in the output state in the non-energized state, and has an input port SLC3a which inputs the line pressure $P_L$ via the oil path d and the like, and an output port SLC3b which regulates the line pressure $P_L$ and outputs a control pressure $P_{SLC3}$ as an engagement pressure $P_{C3}$ to the hydraulic servo 43. That is, the linear solenoid valve SLC3 is structured to be in the output state in which the input port SLC3a and the output port SLC3b are communicated in the non-energized state, and to be capable of decreasing the amount of communication (i.e., reducing the opening amount) between the input port SLC3a and the output port SLC3b in accordance with the command value, i.e., outputting the engagement pressure $P_{C3}$ in accordance with the command value, in the energized state based on the command value from the hydraulic pressure command unit 71 of the control unit (ECU) 70 described later in detail. The output port SLC3b of the linear solenoid valve SLC3 is connected to the hydraulic servo 43 of the clutch C-3 via an oil path e1. The oil path e1 is arranged with a check valve 53 and an orifice 63, and is connected with an oil chamber 33a of a C-3 damper 33 via an oil path e2. Note that, since the C-3 damper 33 has a similar configuration as the accumulator 30 and is a general damper device, a detailed description thereof will be omitted.

The linear solenoid valve (fourth solenoid valve as a regulated pressure supply portion) SLB1 is a normally-closed type which is in the non-output state in the non-energized state, and has an input port SLB1a which inputs the forward range pressure $P_D$ via the oil path a5 and the like, and an output port SLB1b which regulates the forward range pressure $P_D$ and outputs a control pressure $P_{SLB1}$ as an engagement pressure $P_{B1}$ to the hydraulic servo 44. That is, the linear solenoid valve SLB1 is structured to disconnect the input port SLB1a and the output port SLB1b in the non-energized state to be in the non-output state, and to be capable of increasing the amount of communication (opening amount) between the input port SLB1a and the output port SLB1b in accordance with the command value, i.e., outputting the engagement pressure $P_{B1}$ in accordance with the command value, in the energized state based on the command value from the hydraulic pressure command unit 71 of the control unit (ECU) 70 described later in detail. The output port SLB1b of the linear solenoid valve SLB1 is connected to the hydraulic servo 44 of the brake B-1 via an oil path f1. The oil path f1 is arranged with a check valve 54 and an orifice 64, and is connected with an oil chamber 34a of a B-1 damper 34 via an oil path f2.

The solenoid valve S11 is a normally-opened type which is in the output state in the non-energized state, and has an input port S1a which inputs the modulator pressure $P_{MOD}$ via oil paths g1 and g2, and an output port S1b which outputs the modulator pressure $P_{MOD}$ in the non-energized state (i.e., off-state) almost directly as a signal pressure $P_{S1}$. The output port S1b is connected to an oil chamber 21a of the first clutch apply relay valve 21 via oil paths h1 and h2. Further, the output port S1b is connected to an oil chamber 22a of the second clutch apply relay valve 22 via the oil path h1 and an oil path h3, and is connected to an input port 24c of the B-2 relay valve 24 via an oil path h4.

The solenoid valve S12 is a normally-closed type which is in the non-output state in the non-energized state, and has an input port S2a which inputs the modulator pressure $P_{MOD}$ via oil paths g1 and g3, and an output port S2b which outputs the modulator pressure $P_{MOD}$ in the energized state (i.e., on-state) almost directly as a signal pressure $P_{S2}$. The output port S2b is connected to an oil chamber 24a of the B-2 relay valve via an oil path i.

The first clutch apply relay valve 21 is structured to have two spools 21p and 21q, a spring 21s which biases the spool 21p upward in the drawing, a spring 21t which biases the spools 21p and 21q in directions to depart from each other, the oil chamber 21a above the spool 21q in the drawing, an oil chamber 21d below the spool 21p in the drawing, an oil chamber 21c between the two spools 21p and 21q, an oil chamber 21b formed by a difference in diameter (difference in pressure receiving area) of a land portion of the spool 21q, the input port 21e, an input port 21f, an input port 21g, an input port 21h, an output port 21i, an output port 21j, and a drain port EX.

The first clutch apply relay valve 21 is structured such that the input port 21e and the output port 21j are communicated and the input port 21e and the output port 21i are disconnected when the spools 21p and 21q are in the left half positions, and the input port 21e and the output port 21i are communicated and the output port 21j and the drain port EX are communicated when the spools 21p and 21q are in the right half positions. The input port 21h is disconnected when the spool 21p is in the left half position, and the input port 21g is disconnected when the spool 21q is in the right half position.

As described above, the oil chamber 21a is connected to the output port S1b of the solenoid valve S11 via the oil paths h1 and h2, and the oil chamber 21b is connected to an output port 22i of the second clutch apply relay valve 22 described later via an oil path b4 from the input port 21f. The forward range pressure $P_D$ is input to the input port 21e via the oil paths a1 and a2. The output port 21j which communicates with the input port 21e when the spool 21p is in the left half position is connected to an input port 22h of the second clutch apply relay valve 22 via an oil path j. The output port 21i which communicates with the input port 21e when the spool 21p is in the right half position is connected to the input port 21g via oil paths k1 and k2 and to the input port 21h via the oil paths k1, k2 and an oil path k3. That is, the output port 21i is connected to the oil chamber 21c regardless of the positions of the spools 21p and 21q. Further, the output port 21i is connected to an input port 22e of the second clutch apply relay valve 22 described later via the oil path k1. The oil chamber 21d is connected with an output port 23c of the C-2 relay valve 23 via an oil path c5, and the oil path c5 is provided with a check valve 55 and an orifice 65.

The second clutch apply relay valve 22 is structured to have a spool 22p, a spring 22s which biases the spool 22p upward in the drawing, the oil chamber 22a above the spool 22p in the drawing, an oil chamber 22b below the spool 22p in the drawing, the input port 22c, an output port 22d, the input port 22e, the input port 22f, an output port 22g, the input port 22h, and the output port 22i.

The second clutch apply relay valve 22 is structured such that the input port 22c and the output port 22d as well as the output port 22i are communicated, the input port 22f and the output port 22g are communicated, and the input port 22e and the input port 22h are disconnected when the spool 22p is in the left half position, and the input port 22e and the output port 22d are communicated, the input port 22h and the output port 22g are communicated, and the input port 22c, the output port 22i, and the input port 22f are disconnected when the spool 22p is in the right half position.

As described above, the oil chamber 22a is connected to the output port S1b of the solenoid valve S11 via the oil paths h1 and h3, and is connected to the input port 24c of the B-2 relay valve 24 described later via the oil path h4. The input port 22c is connected to the output port SLC1b of the linear solenoid valve SLC1 via the oil path b1, and the output port 22d which connects with the input port 22c when the spool 22p is in the left half position is connected to the hydraulic servo 41 of the clutch C-1 via an oil path b2. The oil path b2 is arranged with a check valve 51 and an orifice 61, and is connected with an oil chamber 31a of a C-1 damper 31 via an oil path b3. In a similar manner, the output port 22i which communicates with the input port 22c when the spool 22p is in the left half position is connected to the input port 21f of the first clutch apply relay valve 21 via the oil path b4, and is connected to the oil chamber 22b via oil paths b4 and b5. The input port 22f is connected to the output port SLC2b of the linear solenoid valve SLC2 via the oil path c1, and the input port 22h is connected to the output port 21j of the first clutch apply relay valve 21 via the oil path j. The output port 22g which communicates with the input port 22f when the spool 22p is in the left half position and communicates with the input port 22h when the spool 22p is in the right half position is connected to an input port 23b of the C-2 relay valve 23 described later via an oil path c2. The oil path c2 is provided with a check valve 52 and an orifice 62, and is connected with an oil chamber 32a of a C2-B2 damper 32 via an oil path c4.

The C-2 relay valve 23 is structured to have a spool 23p, a spring 23s which biases the spool 23p upward in the drawing, an oil chamber 23a above the spool 23p in the drawing, the input port 23b, the output port 23c, an output port 23d, an output port 23e, and a drain port EX.

The C-2 relay valve 23 is structured such that the input port 23b and the output port 23c as well as the output port 23e are communicated and the output port 23d and the drain port EX are communicated when the spool 23p is in the left half position, and the input port 23b and the output port 23d are communicated and the output port 23c as well as the output port 23e and the drain port EX are communicated when the spool 23p is in the right half position.

The oil chamber 23a is connected to an output port 24b of the B-2 relay valve 24 described later via an oil path h5. The input port 23b is connected to the output port 22g of the second clutch apply relay valve 22 via the oil path c2, and the output port 23e which communicates with the input port 23b when the spool 23p is in the left half position is connected to the hydraulic servo 42 of the clutch C-2 via an oil path c3. In a similar manner, the output port 23c which communicates with the input port 23b when the spool 23p is in the left half position is connected to the oil chamber 21d of the first clutch apply relay valve 21 via the oil path c5, and the oil path c5 is provided with the check valve 55 and the orifice 65. The output port 23d which communicates with the input port 23b when the spool 23p is in the right half position is connected to an input port 24e of the B-2 relay valve 24 via an oil path m.

The B-2 relay valve 24 is structured to have a spool 24p, a spring 24s which biases the spool 24p upward in the drawing, the oil chamber 24a above the spool 24p in the drawing, the output port 24b, the input port 24c, an input port 24d, the input port 24e, an output port 24f, an output port 24g, and a drain port EX.

The B-2 relay valve 24 is structured such that the input port 24d and the output port 24f as well as the output port 24g are communicated, the output port 24b and the drain port EX are communicated, and the input port 24c is disconnected when the spool 24p is in the left half position, and the input port 24c and the output port 24b are communicated, the input port 24e and the output port 24g are connected, and the input port 24d and the drain port EX are disconnected when the spool 24p is in the right half position.

The oil chamber 24a is connected to the output port S2b of the solenoid valve S12 via the oil path i. The input port 24d is connected to the reverse range pressure output port (not shown) of the manual shift valve from which the reverse range pressure $P_{REV}$ is output via the oil path 1, and the input port 24e is connected to the output port 23d of the C-2 relay valve 23 via the oil path m. The output port 24g which communicates with the input port 24d when the spool 24p is in the left half position and communicates with the input port 24e when the spool 24p is in the right half position is connected to the hydraulic servo 45 of the brake B-2 via an oil path n. That is, the hydraulic servo 45 of the brake B-2 is connected to the reverse range pressure output port (not shown) of the manual shift valve or the output port SLC2b of the linear solenoid valve SLC2. As described above, the input port 24c is connected to the output port S1b of the solenoid valve S11 via the oil path h4, the oil chamber 22a of the second clutch apply relay valve 22, and the oil paths h1 and h3, and the output port 24b which communicates with the input port 24c when the spool 24p is in the right half position is connected to the oil chamber 23a of the C-2 relay valve 23 via the oil path h5. Note that the output port 24f which communicates with the input port 24d when the spool 24p is in the left half position is connected to an oil chamber of the primary regulator valve via an oil path (not shown), and is structured such that the reverse range pressure $P_{REV}$ is applied to the primary regulator valve so as to increase the line pressure $P_L$ when moving in reverse.

[Operation of Hydraulic Control Device]

Next, the application of the hydraulic control device 6 according to this embodiment will be described.

For example, when a driver turns on the ignition, the hydraulic control of the hydraulic control device 6 is started. First, for example, when the selected position of the shift lever is in the P range or the N range, the normally-opened type linear solenoid valve SLC2, linear solenoid valve SLC3, and solenoid valve S11 are energized by an electric command of the hydraulic pressure command unit 71 of the control unit 70, and the respective input ports and the output ports are disconnected. Next, for example, when the engine is started, a hydraulic pressure is generated by the rotation of the oil pump (not shown) based on the engine rotation, and the hydraulic pressure is regulated and output as the line pressure $P_L$ or the modulator pressure $P_{MOD}$ by the primary regulator valve or the solenoid modulator valve as described above. The line pressure $P_L$ is input to the input port of the manual shift valve (not shown) and to the input port SLC3a of the linear solenoid valve SLC3 via the oil path d, and the modulator pressure $P_{MOD}$ is input to the input ports S1a and S2a of the solenoid valves S11 and S12 via the oil paths g1, g2, and g3.

[Operation in N-D State (First Forward Speed)]

Next, for example, when the driver brings the shift lever from the N range position to the D range position, the forward range pressure $P_D$ is output from the forward range pressure output port of the manual shift valve to the oil paths a1, a4, and a5. The forward range pressure $P_D$ is input to the linear solenoid valve SLC1 via the oil path a1, to the linear solenoid valve SLC2 via the oil path a4, to the linear solenoid valve SLB1 via the oil path a5, and to the first clutch apply relay valve 21 via the oil paths a1 and a2.

The oil path a1 is provided with the check valve 50 and the orifice 60. Since the forward range pressure PD opens the check valve 50, the supply of the forward range pressure $P_D$ to the linear solenoid valve SLC1 is more rapid compared to the time of discharge. The forward range pressure $P_D$ supplied to the oil path a1 is input to the oil chamber 30a of the accumulator 30 via the oil path a3, and a pressure accumulation of the forward range pressure $P_D$ supplied to the linear solenoid valve SLC1 is performed by the accumulator 30.

The first clutch apply relay valve 21 in which the forward range pressure $P_D$ is input to the input port 21e from the oil path a2 is in the left half position due to the biasing force of the spring 21s immediately after the switch to the D range (immediately after an N-D shift) since the solenoid valve S11 is turned on and the signal pressure $P_{S1}$ is not output. Thus, the forward range pressure $P_D$ is output to the oil path j from the output port 21j. In a similar manner, since the solenoid valve S11 is turned on and the signal pressure $P_{S1}$ is not output, the second clutch apply relay valve 22 is in the left half position due to the biasing force of the spring 22s, and the input port 22h is disconnected.

Next, for example, when the first forward speed is confirmed by a shift determination unit 75 (see FIG. 1) of the control unit 70 described later, the electric control of the control unit 70 causes the linear solenoid valve SLC1 to be turned on, the forward range pressure $P_D$ input to the input port SLC1a to be subjected to pressure regulation control, the control pressure $P_{SLC1}$ to be output as the engagement pressure $P_{C1}$ from the output port SLC1b to gradually increase, and the control pressure $P_{SLC1}$ (engagement pressure $P_{C1}$) to be input to the input port 22c of the second clutch apply relay valve 22 via the oil path b1.

The second clutch apply relay valve 22 in the left half position outputs the control pressure $P_{SLC1}$, which is input to the input port 22c, from the output port 22i and also from the output port 22d. The control pressure $P_{SLC1}$ output from the output port 22i is input to the oil chamber 22b via the oil paths b4 and b5 to lock the second clutch apply relay valve 22 in the left half position, and is input to the oil chamber 21b of the first clutch apply relay valve 21 via the oil path b4 to press the spools 21p and 21q downward in the drawing against the biasing force of the spring 21s to switch the first clutch apply relay valve 21 to the right half position.

In the first clutch apply relay valve 21 in which the spools 21p and 21q are switched to the right half positions, the spool 21q is pressed downward in the drawing against the biasing force of the spring 21t by the control pressure $P_{SLC1}$ output from the output port 22i of the second clutch apply relay valve 22. However, since the forward range pressure $P_D$ input through the input port 21e is output from the output port 21i and input to the oil chamber 21c via the oil paths k1, k2, and k3 and the input port 21h, the spool 21q is switched to the upper side in the drawing by the hydraulic pressure applied to the oil chamber 21c and by the biasing force of the spring 21t. That is, the spool 21p and the spool 21q are locked in a distant state. Note that the forward range pressure $P_D$ input from the oil path k1 to the input port 22e of the second clutch apply relay valve 22 is blocked in the input port 22e.

The control pressure $P_{SLC1}$ input to the input port 22c of the second clutch apply relay valve 22 from the linear solenoid valve SLC1 as described above is output as the engagement pressure $P_{C1}$ to the hydraulic servo 41 via the oil path b2 from the output port 22d to engage the clutch C-1. Accordingly, by a combination with the lock of the one-way clutch F-1, the first forward speed is achieved.

The oil path b2 is provided with the check valve 51 and the orifice 61. The check valve 51 is closed when the engagement pressure $P_{C1}$ (control pressure $P_{SLC1}$) is supplied to the hydraulic servo 41 such that the hydraulic pressure is supplied moderately via only the orifice 61, and the engagement pressure $P_{C1}$ is discharged from the hydraulic servo 41 more rapidly compared to a case where the supply is made with the check valve 51 opened. The engagement pressure $P_{C1}$ supplied to the oil path b2 is input to the oil chamber 31a of the C-1 damper 31 via the oil path b3, and the pulsation of the engagement pressure $P_{C1}$ supplied and discharged to and from the hydraulic servo 41 is prevented, and suction of a surge pressure (rapid changing pressure) is performed by the C-1 damper 31.

[Operation of Engine Braking in First Forward Speed]

For example, when an engine braking in the first forward speed is confirmed by the shift determination unit 75 of the control unit 70, the solenoid valve S12 is turned on, the solenoid valve S11 is turned off, and the linear solenoid valve SLC2 is subjected to pressure regulation control by the electric command from the control unit 70. When the solenoid valve S12 is turned on, the modulator pressure $P_{MOD}$ input to the input port S2a via the oil paths g1 and g3 is output from the output port S2b as the signal pressure $P_{S2}$ and input to the oil chamber 24a of the B-2 relay valve 24 via the oil path i, and the spool 24p is switched to the lower side in the drawing against the biasing force of the spring 24s such that the B-2 relay valve 24 is brought to the right half position.

When the solenoid valve S11 is turned off, the modulator pressure $P_{MOD}$ input to the input port S1a via the oil paths g1 and g2 is output from the output port S1b as the signal pressure $P_{S1}$, and input to the oil chamber 21a of the first clutch apply relay valve 21 via the oil paths h1 and h2, to the oil chamber 22a of the second clutch apply relay valve 22 via the oil paths h1 and h3, to the input port 24c of the B-2 relay valve 24 via the oil path h4, and to the oil chamber 23a of the C-2 relay valve 23 via the oil path h5 from the output port 24b of the B-2 relay valve 24 in the right half position.

In the C-2 relay valve 23, the spool 23p is switched to the lower side in the drawing against the biasing force of the spring 23s by the signal pressure $P_{S1}$ input to the oil chamber 23a to be in the right half position. Note that, in the first clutch apply relay valve 21, the spool 21q is switched to the lower side in the drawing to be in the right half position since the signal pressure $P_{S1}$ is input to the oil chamber 21a, but the spool 21p is in the same right half position as that in the first forward speed and is not particularly influenced. In the second clutch apply relay valve 22, although the signal pressure $P_{S1}$ is input to the oil chamber 22a, the spool 22p stays locked in the left half position since the engagement pressure $P_{C1}$ of the oil chamber 22b and the biasing force of the spring 22s are stronger.

When the linear solenoid valve SLC2 is subjected to pressure regulation control and the control pressure $P_{SLC2}$ is output from the output port SLC2b, the control pressure $P_{SLC2}$ is input to the input port 22f of the second clutch apply relay valve 22 locked in the left half position via the oil path c1, and is output to the oil path c2 from the output port 22g as the engagement pressure $P_{B2}$.

The engagement pressure $P_{B2}$ output to the oil path c2 is input to the input port 23b of the C-2 relay valve 23 in the right half position, and is output from the output port 23d. Further, the engagement pressure $P_{B2}$ is input to the input port 24e of the B-2 relay valve 24 in the right half position via the oil path m, output from the output port 24g, and input to the hydraulic servo 45 via the oil path n to lock the brake B-2. Accordingly, in combination with the engagement of the clutch C-1, the engine braking in the first forward speed is achieved.

Note that the oil path c2 is provided with the check valve 52 and the orifice 62. The check valve 52 is closed when the engagement pressure $P_{B2}$ is supplied to the hydraulic servo 45 of the brake B-2 such that the hydraulic pressure is supplied moderately via only the orifice 62, and the check valve 52 is opened to discharge the hydraulic pressure in the oil path c2 rapidly at the time of discharge described later. Further, the engagement pressure $P_{B2}$ supplied to the oil path c2 is input to the oil chamber 32a of the C2-B2 damper 32 via the oil path c4, and the pulsation of the engagement pressure $P_{B2}$ supplied and discharged to and from the hydraulic servo 45 is prevented, and suction of a surge pressure (rapid changing pressure) is performed by the C2-B2 damper 32.

For example, when a positive drive in the first forward speed is confirmed, i.e., the release of the engine braking state is confirmed, by the shift determination unit 75 of the control unit 70, the solenoid valve S12 is turned off, the solenoid valve S11 is turned on, and the linear solenoid valve SLC2 is turned on (energized) and closed such that the control pressure $P_{SLC2}$ as the engagement pressure $P_{B2}$ is reduced to zero and drained. Since the B-2 relay valve 24 is switched to the left half position by the solenoid valve S12 being turned off, the engagement pressure $P_{B2}$ of the hydraulic servo 45 of the brake B-2 is discharged from the drain port of the manual shift valve via the input port 24d, the oil path l, and the reverse range pressure output port (not shown) of the manual shift valve. Accordingly, a quick drain quicker than the drainage via the linear solenoid valve SLC2 is performed to quickly release the brake B-2. Note that the hydraulic pressure in the oil path m is discharged from the drain port EX of the C-2 relay valve 23 switched to the left half position, and the hydraulic pressures in the oil paths c1 and c2 are discharged from the drain port EX of the linear solenoid valve SLC2.

[Operation in Second Forward Speed]

Next, for example, when the second forward speed is confirmed by the shift determination unit 75 of the control unit 70 from the state of the first forward speed, the linear solenoid valve SLB1 is subjected to pressure regulation control while the pressure regulated state of the linear solenoid valve SLC1 is maintained in a state where the solenoid valve S11 is turned on and the solenoid valve S12 is turned off by the electric command from the control unit 70 in a similar manner as in the first forward speed (excluding the time of the engine braking).

That is, when the linear solenoid valve SLB1 is subjected to the pressure regulation control, the control pressure $P_{SLB1}$ is output from the output port SLB1b as the engagement pressure $P_{B1}$, and input to the hydraulic servo 44 via the oil path f1 to lock the brake B-1. Accordingly, in combination with the engagement of the clutch C-1, the second forward speed is achieved.

The oil path f1 is provided with the check valve 54 and the orifice 64. The check valve 54 is closed when the engagement pressure $P_{B1}$ is supplied to the hydraulic servo 44 of the brake B-1 such that the hydraulic pressure is supplied moderately via only the orifice 64, and the engagement pressure $P_{B1}$ is discharged from the hydraulic servo 44 more rapidly compared to a case where the supply is made with the check valve 54 opened. Further, the engagement pressure $P_{B1}$ supplied to the oil path f1 is input to the oil chamber 34a of the B-1 damper 34 via the oil path f2, and the pulsation of the engagement pressure $P_{B1}$ supplied and discharged to and from the hydraulic servo 44 is prevented, and suction of a surge pressure (rapid changing pressure) is performed by the B-1 damper 34.

[Operation in Third Forward Speed]

Next, for example, when the third forward speed is confirmed by the shift determination unit 75 of the control unit 70 from the state of the second forward speed, the linear solenoid valve SLB1 is turned off to be closed and the pressure regulation control of the linear solenoid valve SLC3 is performed while the pressure regulated state of the linear solenoid valve SLC1 is maintained in the state where the solenoid valve S11 is turned on and the solenoid valve S12 is turned off in a similar manner by the electric command from the control unit 70.

That is, the release control of the brake B-1 is performed by the pressure regulation control of the linear solenoid valve SLB1, i.e., the engagement pressure $P_{B1}$ (control pressure $P_{SLB1}$) of the hydraulic servo 44 of the brake B-1 is subjected to discharge control by the drain port EX of the linear solenoid valve SLB1 via the oil path f1, to release the brake B-1. The pressure regulation control is performed from the closed state where the linear solenoid valve SLC3 is turned on (energized) to bring the control pressure $P_{SLC3}$ to zero. The control pressure $P_{SLC3}$ is output from the output port SLC3b as the engagement pressure $P_{C3}$ and input to the hydraulic servo 43 via the oil path e1 to engage the clutch C-3. Accordingly, in combination with the engagement of the clutch C-1, the third forward speed is achieved.

The oil path e1 is provided with the check valve 53 and the orifice 63. The check valve 53 is closed when the engagement pressure $P_{C3}$ is supplied to the hydraulic servo 43 of the clutch C-3 such that the hydraulic pressure is supplied moderately via only the orifice 63, and the engagement pressure $P_{C3}$ is discharged from the hydraulic servo 43 more rapidly compared to a case where the supply is made with the check valve 53 opened. Further, the engagement pressure $P_{C3}$ supplied to the oil path e1 is input to the oil chamber 33a of the C-3 damper 33 via the oil path e2, and the pulsation of the engagement pressure $P_{C3}$ supplied and discharged to and from the hydraulic servo 43 is prevented, and suction of a surge pressure (rapid changing pressure) is performed by the C-3 damper 33.

[Operation in Fourth Forward Speed]

Next, for example, when the fourth forward speed is confirmed by the shift determination unit 75 of the control unit 70 from the state of the third forward speed, the linear solenoid valve SLC3 is turned off to be closed and the pressure regulation control of the linear solenoid valve SLC2 is performed while the pressure regulated state of the linear solenoid valve SLC1 is maintained in the state where the solenoid valve S11 is turned on and the solenoid valve S12 is turned off in a similar manner by the electric command from the control unit 70.

That is, the release control of the clutch C-3 is performed by the pressure regulation control of the linear solenoid valve SLC3, i.e., the engagement pressure $P_{C3}$ (control pressure $P_{SLC3}$) of the hydraulic servo 43 of the clutch C-3 is subjected to discharge control by the drain port EX of the linear solenoid valve SLC3 via the oil path e1, to release the clutch C-3. The pressure regulation control is performed from the closed state where the linear solenoid valve SLC2 is turned on (energized) to bring the control pressure $P_{SLC2}$ to zero. The control pressure $P_{SLC2}$ is output from the output port SLC2b as the engagement pressure $P_{C2}$ and input to the input port 22f of the second clutch apply relay valve 22 via the oil path c1.

Since the signal pressure $P_{S1}$ is not input to the oil chamber 22a due to the solenoid valve S11 being turned on and the second clutch apply relay valve 22 is locked to the left half position by the engagement pressure $P_{C1}$ input to the oil chamber 22b as described above, the control pressure $P_{SLC2}$ (engagement pressure $P_{C2}$) input to the input port 22f is output as the engagement pressure $P_{C2}$ from the output port 22g. The engagement pressure $P_{C2}$ output from the output port 22g is input to the input port 23b of the C-2 relay valve 23 via the oil path c2.

Further, since the solenoid valve S12 is turned off, the B-2 relay valve 24 is in the left half position, the oil chamber 23a and the oil path h5 are in drain states, and the C-2 relay valve 23 is in the left half position by the biasing force of the spring 23s, the engagement pressure $P_{C2}$ input to the input port 23b is output from the output port 23c and also output from the output port 23e. The engagement pressure $P_{C2}$ output from the output port 23c is input to the oil chamber 21d of the first clutch apply relay valve 21 via the oil path c5. The engagement pressure $P_{C2}$ combined with the biasing force of the spring 21s causes the spool 21p of the first clutch apply relay valve 21 to be switched and locked to the left half position. At this time, the forward range pressure $P_D$ input to the input port 22e via the oil path k1 is switched to the output port 21j from the output port 21i and output to the oil path j, but is blocked by the input port 22h of the second clutch apply relay valve 22. Since the forward range pressure $P_D$ supplied to the oil path k1 is blocked, the supply of the forward range pressure $P_D$ as a lock pressure with respect to the oil chamber 21c via the oil paths k2 and k3 is released.

Note that the oil path c5 is provided with the check valve 55 and the orifice 65. The check valve 55 is closed when the engagement pressure $P_{C2}$ is supplied to the oil chamber 21d of the first clutch apply relay valve 21 such that the hydraulic pressure is supplied moderately via only the orifice 65, and the engagement pressure $P_{C2}$ is discharged from the oil chamber 21d more rapidly compared to a case where the supply is made with the check valve 55 opened.

The engagement pressure $P_{C2}$ output from the output port 23e of the C-2 relay valve 23 is input to the hydraulic servo 42 via the oil path c3 to engage the clutch C-2. Accordingly, in combination with the engagement of the clutch C-1, the fourth forward speed is achieved.

As described above, the oil path c2 is provided with the check valve 52 and the orifice 62. In a similar manner as the engine braking in the first forward speed, the check valve 52 is closed when the engagement pressure $P_{C2}$ is supplied to the hydraulic servo 42 of the clutch C-2 such that the hydraulic pressure is supplied moderately via only the orifice 62, and the engagement pressure $P_{C2}$ is discharged from the hydraulic servo 42 more rapidly compared to a case where the supply is made with the check valve 52 opened. Further, the engagement pressure $P_{C2}$ supplied to the oil path c2 is input to the oil chamber 32a of the C2-B2 damper 32 via the oil path c4, and the pulsation of the engagement pressure $P_{C2}$ supplied/discharged with respect to the hydraulic servo 42 is prevented and suction or the like of a surge pressure (rapid changing pressure) is performed by the C2-B2 damper 32.

[Operation in Fifth Forward Speed]

Next, for example, when the fifth forward speed is confirmed by the shift determination unit 75 of the control unit 70 from the state of the fourth forward speed, the linear solenoid valve SLC1 is turned off to be closed and the pressure regulation control of the linear solenoid valve SLC3 is performed while the pressure regulated state of the linear solenoid valve SLC2 is maintained in the state where the solenoid valve S111 is turned on and the solenoid valve S12 is turned off in a similar manner by the electric command from the control unit 70.

That is, the release control of the clutch C-1 is performed by the pressure regulation control of the linear solenoid valve SLC1, i.e., the engagement pressure $P_{C1}$ (control pressure $P_{SLC1}$) of the hydraulic servo 41 of the clutch C-1 is controlled to be discharged from the drain port EX of the linear solenoid valve SLC1 via the oil paths b1 and b2, to release the clutch C-1. In a similar manner as in the third forward speed, the pressure regulation control is performed from the closed state where the linear solenoid valve SLC3 is turned on (energized) to bring the control pressure $P_{SLC3}$ to zero. The control pressure $P_{SLC3}$ is output from the output port SLC3b as the engagement pressure $P_{C3}$ and input to the hydraulic servo 43 via the oil path e1 to engage the clutch C-3. Accordingly, in combination with the engagement of the clutch C-2, the fifth forward speed is achieved.

[Operation in Sixth Forward Speed]

For example, when the sixth forward speed is confirmed by the shift determination unit 75 of the control unit 70 from the state of the fifth forward speed, the linear solenoid valve SLC3 is turned on (energized) to be closed and the pressure regulation control of the linear solenoid valve SLB1 is performed while the pressure regulated state of the linear solenoid valve SLC2 is maintained in the state where the solenoid valve S11 is turned on and the solenoid valve S12 is turned off in a similar manner by the electric command from the control unit 70.

That is, the release control of the clutch C-3 is performed by the pressure regulation control of the linear solenoid valve SLC3, i.e., the engagement pressure $P_{C3}$ (control pressure $P_{SLC3}$) of the hydraulic servo 43 of the clutch C-3 is controlled to be discharged from the drain port EX of the linear solenoid valve SLC3 via the oil path e1, to release the clutch C-3. In a similar manner as in the second forward speed, the linear solenoid valve SLB1 is turned on (energized) to perform the pressure regulation control from the closed state where the linear solenoid valve SLB1 is turned off to bring the control pressure $P_{SLB1}$ to zero. The control pressure $P_{SLB1}$ is output from the output port SLB1b as the engagement pressure $P_{B1}$ and input to the hydraulic servo 44 via the oil path f1 to engage the brake B-1. Accordingly, in combination with the engagement of the clutch C-2, the sixth forward speed is achieved.

[Operation in D-N State]

Then, for example, when the shift lever is brought to the N range position from the D range position after the driver has decelerated the vehicle to cause a downshift according to the vehicle speed and stopped the vehicle in the first forward speed, the forward range pressure output port of the manual shift valve is disconnected from the input port and communicated with the drain port. That is, the forward range pressure $P_D$ is drained.

Simultaneously, when a shift lever sensor (not shown) detects that the shift lever is in the N range position and the control unit 70 confirms the N range based on the shift lever position, the linear solenoid valve SLC2 and the linear solenoid valve SLC3 are turned on (energized), and the linear solenoid valve SLB1 is turned off. The control pressures $P_{SLC2}$, $P_{SLC3}$, and $P_{SLB1}$ are drained to zero pressures (non-output states), i.e., the hydraulic pressures of the respective hydraulic servos 42, 43, 44, and 45 are drained, to release the clutch C-2, the clutch C-3, the brake B-1, and the brake B-2. Note that the solenoid valve S11 is maintained in the on-state (energized state) and the solenoid valve S12 is maintained in the off-state. That is, the signal pressures $P_{S1}$, and $P_{S2}$ are not output from the two solenoid valves S11 and S12.

For example, since a release shock occurs when the clutch C-1 is suddenly released, the linear solenoid valve SLC1 performs the pressure regulation control to gradually reduce the control pressure $P_{SLC1}$ and finally drains the control pressure $P_{SLC1}$ to zero pressure (non-output state) to moderately release the clutch C-1. When the clutch C-1 is released, all clutches and brakes are released to bring the automatic transmission 3 to a neutral state.

During the release control by the linear solenoid valve SLC1, since the accumulator 30 connected to the input port SLC1a of the linear solenoid valve SLC1 via the oil path a3 and the like releases the hydraulic pressure accumulated while in the D range to perform pressure maintenance with respect to the oil paths a1 and a3 located closer to the linear solenoid valve SLC1 than the orifice 60, a moderate release control of the clutch C-1 by the linear solenoid valve SLC1 is possible. Accordingly, the occurrence of the release shock is prevented in a D-N shift operation from the state of the first forward speed.

[Operation in First Reverse Speed]

For example, when the shift lever is brought to the R range position by the operation of the shift lever by the driver, the reverse range pressure $P_{REV}$ is output from the reverse range pressure output port of the manual shift valve as described above, and the reverse range pressure $P_{REV}$ is input to the input port 24d of the B-2 relay valve 24 via the oil path 1.

Simultaneously, when the shift lever sensor (not shown) detects that the shift lever is in the R range position and the control unit 70 confirms the R range based on the shift lever position, the solenoid valve S11 is maintained in the on-state (energized state) and the solenoid valve S12 is maintained in the off-state. That is, the signal pressure $P_{S2}$ is not output. Therefore, the B-2 relay valve 24 is maintained in the left half position by the biasing force of the spring 24s. Accordingly, the reverse range pressure $P_{REV}$ input to the input port 24d is supplied to the hydraulic servo 45 of the brake B-2 via the output port 24g and the oil path n to engage the brake B-2.

Further, the control unit 70 performs the pressure regulation control such that the control pressure $P_{SLC3}$ is gradually output by the linear solenoid valve SLC3 as the engagement pressure $P_{C3}$ from the output port SLC3b and input to the hydraulic servo 43 via the oil path e1. That is, the clutch C-3 is moderately engaged. Accordingly, in combination with the locking of brake B-2, the first reverse speed is achieved.

Note that, when switched from the R range to the N range, control is performed in a similar manner to the N range. That is, the engagement pressure $P_{B2}$ of the hydraulic servo 45 of the brake B-2 is drained via the oil path n, the B-2 relay valve 24, the oil path 1, and the manual shift valve, and the engagement pressure $P_{C3}$ of the hydraulic servo 43 of the clutch C-3 is drained from the linear solenoid valve SLC3.

For example, when the driver operates the shift lever to the R range position and a vehicle speed of a predetermined speed or greater in the forward direction is detected, a so-called reverse inhibit function is performed in which the control unit 70 causes the solenoid valve S12 to be turned on and the on-state (energized state) of the linear solenoid valve SLC3 to be maintained, i.e., the R range pressure $P_{REV}$ to be blocked by the B-2 relay valve 24 so as not to be supplied to the hydraulic servo 45 of the brake B-2 and the engagement pressure $P_{C3}$ (control pressure $P_{SLC3}$) to be not supplied to the hydraulic servo 43 of the clutch C-3, to prevent the achievement of the first reverse speed.

[Operation in Solenoid All-Off Failure State]

Next, the operation in a solenoid all-off failure state in the hydraulic control device 6 will be described. In the case where all of the solenoid valves (the linear solenoid valve SLC1, the linear solenoid valve SLC2, the linear solenoid valve SLC3, the linear solenoid valve SLB1, the solenoid valve S11, and the solenoid valve S12) fail (hereinafter called an "all-off failure") due to, for example, a short circuit or disconnection of a battery during a normal driving with the shift lever position in the D range, the normally-closed type linear solenoid valve SLC1, linear solenoid valve SLB1, and solenoid valve S12 do not output hydraulic pressures, and the normally-opened type linear solenoid valve SLC2, linear solenoid valve SLC3, and solenoid valve S11 respectively output hydraulic pressures.

In the first clutch apply relay valve 21 when driving in the first forward speed to the third forward speed in the normal state, the spool 21p is locked to the right half position by the forward range pressure $P_D$ input to the oil chamber 21c as described above. Therefore, the forward range pressure $P_D$ output from the output port 21i is input to the input port 22e of the second clutch apply relay valve 22 via the oil path k1 and blocked by the second clutch apply relay valve 22 in the left half position.

When the all-off failure occurs in this state, the second clutch apply relay valve 22 is switched to the right half position by the signal pressure $P_{S1}$ output from the solenoid valve S11 being input to the oil chamber 22a via the oil paths h1 and h3, and the forward range pressure $P_D$ input to the input port 22e is output from the output port 22d and input to the hydraulic servo 41 via the oil path b2 to engage the clutch C-1. The control pressure $P_{SLC2}$ (engagement pressure $P_{C2}$) output from the normally opened linear solenoid valve SLC2 is blocked by the input port 22f of the second clutch apply relay valve 22 switched to the right half position. Further, in the normally opened linear solenoid valve SLC3, the line pressure $P_L$ input to the input port SLC3a is almost directly output as the engagement pressure $P_{C3}$ from the output port SLC3b and input to the hydraulic servo 43 via the oil path e1 to engage the clutch C-3. Accordingly, the clutch C-1 and the clutch C-3 are engaged to achieve the third forward speed (see FIG. 3). That is, when the all-off failure occurs while driving in the first forward speed to the third forward speed, the driving state in the third forward speed is ensured.

When driving in the fourth forward speed to the sixth forward speed in the normal state, since the engagement pressure $P_{C2}$ of the clutch C-2 is input to the oil chamber 21d of the first clutch apply relay valve 21 via the oil path c1, the second clutch apply relay valve 22, the oil path c2, the C-2 relay valve 23, and the oil path c5 as described above to lock the spools 21p and 21q in the left half positions, the forward range pressure $P_D$ output from the output port 21j is input to the input port 22h of the second clutch apply relay valve 22 via the oil path j and blocked by the second clutch apply relay valve 22 in the left half position.

When the all-off failure occurs in this state, since the second clutch apply relay valve 22 is switched to the right half position by the signal pressure $P_{S1}$ output from the solenoid valve S11 being input to the oil chamber 22a via the oil paths h1 and h3, and the B-2 relay valve 24 is not switched and maintained in the left half position by the solenoid valve S12 being turned off, the oil path h4 is disconnected and the signal pressure $P_{S1}$ of the solenoid valve S11 is not output to the oil path h5. Thus, the C-2 relay valve 23 is also not switched and maintained in the left half position. Therefore, the forward range pressure $P_D$ input to the input port 22h of the second clutch apply relay valve 22 is output from the output port 22g and input to the hydraulic servo 42 via the oil path c2, the C-2 relay valve 23, and the oil path c3 to engage the clutch C-2. The control pressure $P_{SLC2}$ (engagement pressure $P_{C2}$) output from the normally opened linear solenoid valve SLC2 is blocked by the input port 22f of the second clutch apply relay valve 22 switched to the right half position, but the forward range pressure $P_D$ output to the oil path c2 is output also to the oil path c5 via the C-2 relay valve 23 and input to the oil chamber 21d of the first clutch apply relay valve 21. Therefore, the first clutch apply relay valve 21 continues to be locked in the left half position. In the normally opened linear solenoid valve SLC3, the line pressure $P_L$ input to the input port SLC3a is almost directly output as the engagement pressure $P_{C3}$ from the output port SLC3b and input to the hydraulic servo 43 via the oil path e1 to engage the clutch C-3. Accordingly, the clutch C-2 and the clutch C-3 are engaged to achieve the fifth forward speed (see FIG. 3). That is, when the all-off failure occurs while driving in the fourth forward speed to the sixth forward speed, the driving state in the fifth forward speed is ensured.

When the vehicle is stopped and the shift lever is temporarily brought to the N range position in the case where the all-off failure has occurred in the normal driving state in the fourth forward speed to the sixth forward speed, the manual shift valve (not shown) stops the output and drains the forward range pressure $P_D$. Particularly, the forward range pressure $P_D$ for the normally opened linear solenoid valve SLC2 and the input port 21e of the first clutch apply relay valve 21 is drained. Thus, the forward range pressure $P_D$ which has been input to the oil chamber 21d via the oil paths j, c2, and c5 is drained to release the lock by the forward range pressure $P_D$. Since the signal pressure $P_{S1}$ from the normally opened solenoid valve S11 continues to be output, the spools 21p and 21q are switched to the right half positions by the signal pressure $P_{S1}$ input to the oil chamber 21a in the first clutch apply relay valve 21.

Note that, since the line pressure $P_L$ is the source pressure in the N range state at the time of the all-off failure and the control pressure $P_{SLC3}$ (engagement pressure $P_{C3}$) which is approximately the same as the line pressure $P_L$ is output from the normally opened linear solenoid valve SLC3, the clutch C-3 is in the engaged state. Since the clutches C-1 and C-2 and the brakes B-1 and B-2 are in the released states even though the clutch C-3 is engaged, and the sun gear S3 and the carrier CR2 run idle even if the decelerated rotation is input to the sun gear S2, it is approximately in the neutral state between the input shaft 10 and the counter gear 11 (see FIG. 2).

For example, when the driver returns the shift lever to the D range position, the forward range pressure $P_D$ is output from the manual shift valve. The forward range pressure $P_D$ is input to the input port 21e of the first clutch apply relay valve 21 switched to the right half position, output to the oil path k1 from the output port 21i, and input to the hydraulic servo 41 of the clutch C-1 via the input port 22e of the second clutch apply relay valve 22 in the right half position, the output port 22d, and the oil path b2 to engage the clutch C-1. That is, it is brought to a state similar to the all-off failure state while driving in the first forward speed to the third forward speed to ensure the third forward speed. Accordingly, the vehicle can be restarted even after the all-off failure and after the vehicle is temporarily stopped, whereby the limp-home function is ensured.

[Description of the Present Invention]

Next, a control device 1 for the automatic transmission according to the present invention will be described mainly with reference to FIGS. 1 and 6 to 8B.

Figure 2:
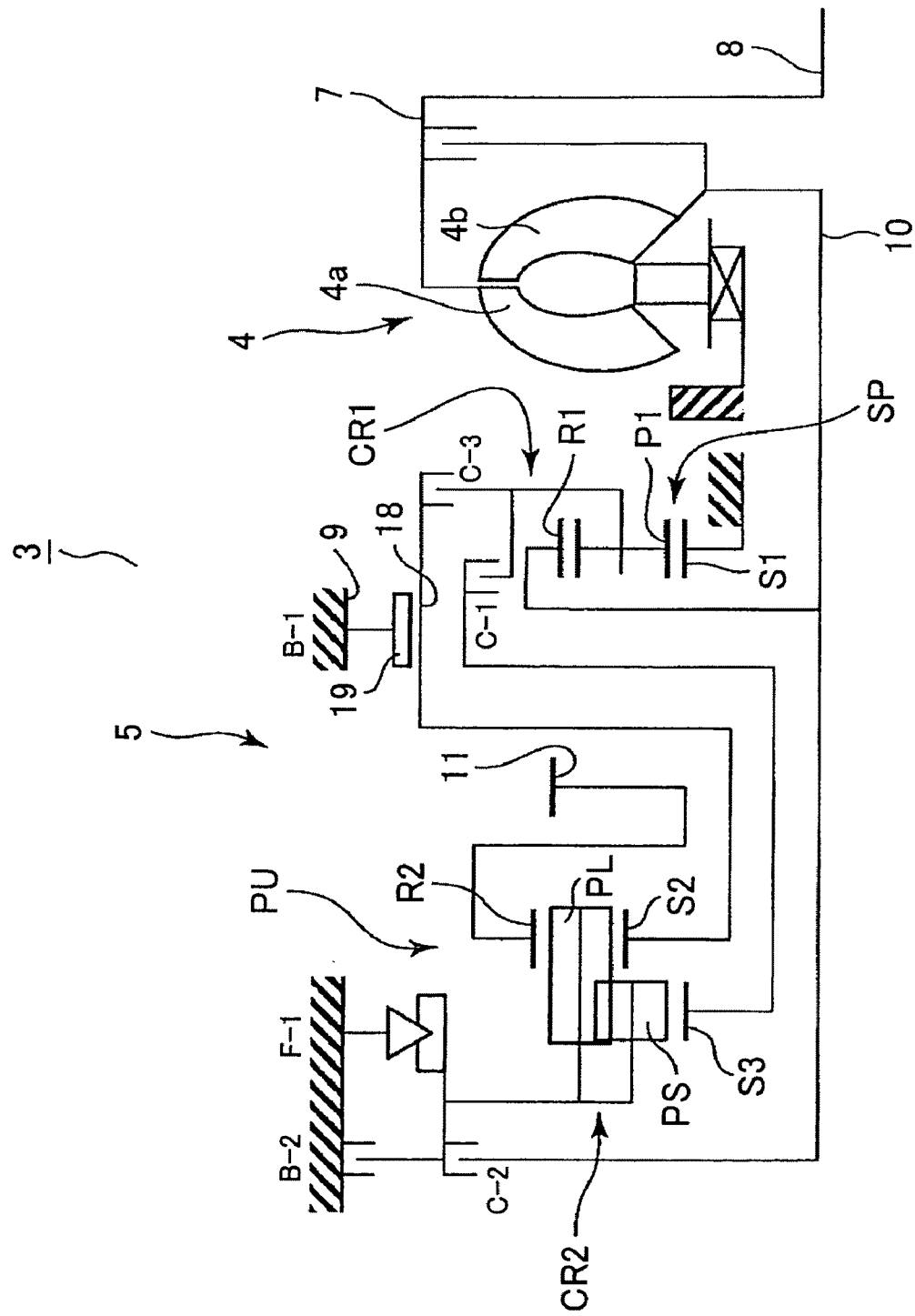
FIG. 2 is a skeleton view showing an automatic transmission to which the present invention can be applied.

As shown in FIG. 1, the control device 1 for the automatic transmission has the control unit (ECU) 70. The control unit 70 is connected with an accelerator opening degree sensor 81, an output shaft rotation speed (vehicle speed) sensor 82, and the like, and is connected to the respective linear solenoid valves SLC1, SLC2, SLC3, and SLB1, and the solenoid valves S11 and S12, for example, of the hydraulic control device 6. The control unit 70 includes the hydraulic pressure command unit 71 having a normal state hydraulic pressure setting unit 72, an input torque detection unit 73, a torque distribution determination unit 74, the shift determination unit 75, and a shift map map.

The shift determination unit 75 references the shift map map based on the accelerator opening degree detected by the accelerator opening degree sensor 81 and the vehicle speed detected by the output shaft rotation speed sensor 82 to determine the first forward speed to the sixth forward speed. That is, an upshift line and a downshift line (shift points) corresponding to the accelerator opening degree and the vehicle speed are recorded in the shift map map, and the shift is confirmed by the shift determination unit 75 when the accelerator opening degree and the vehicle speed at that point exceed the shift lines (see steps S1 and S2 of FIG. 6). The shift speed determined by the shift determination unit 75 is output to the hydraulic pressure command unit 71 and the torque distribution determination unit 74.

The input torque detection unit 73 measures an engine torque (see step S3 of FIG. 6) by inputting an engine torque signal from the engine 2, and detects an input torque currently input to the input shaft 10 of the automatic speed change mechanism 5. The torque distribution determination unit 74 determines (calculates) the torque distribution (see step S4 of FIG. 6) of the clutch and brake (see FIG. 3) engaged in the automatic speed change mechanism 5 based on the shift speed determined by the shift determination unit 75, i.e., the ratio to the input torque necessary for the clutch and brake based on the respective gear ratios ($\lambda_1$, $\lambda_2$, $\lambda_3$, $\lambda_4$, and $\lambda_5$ of FIGS. 8A and 8B described later).

Figure 6:
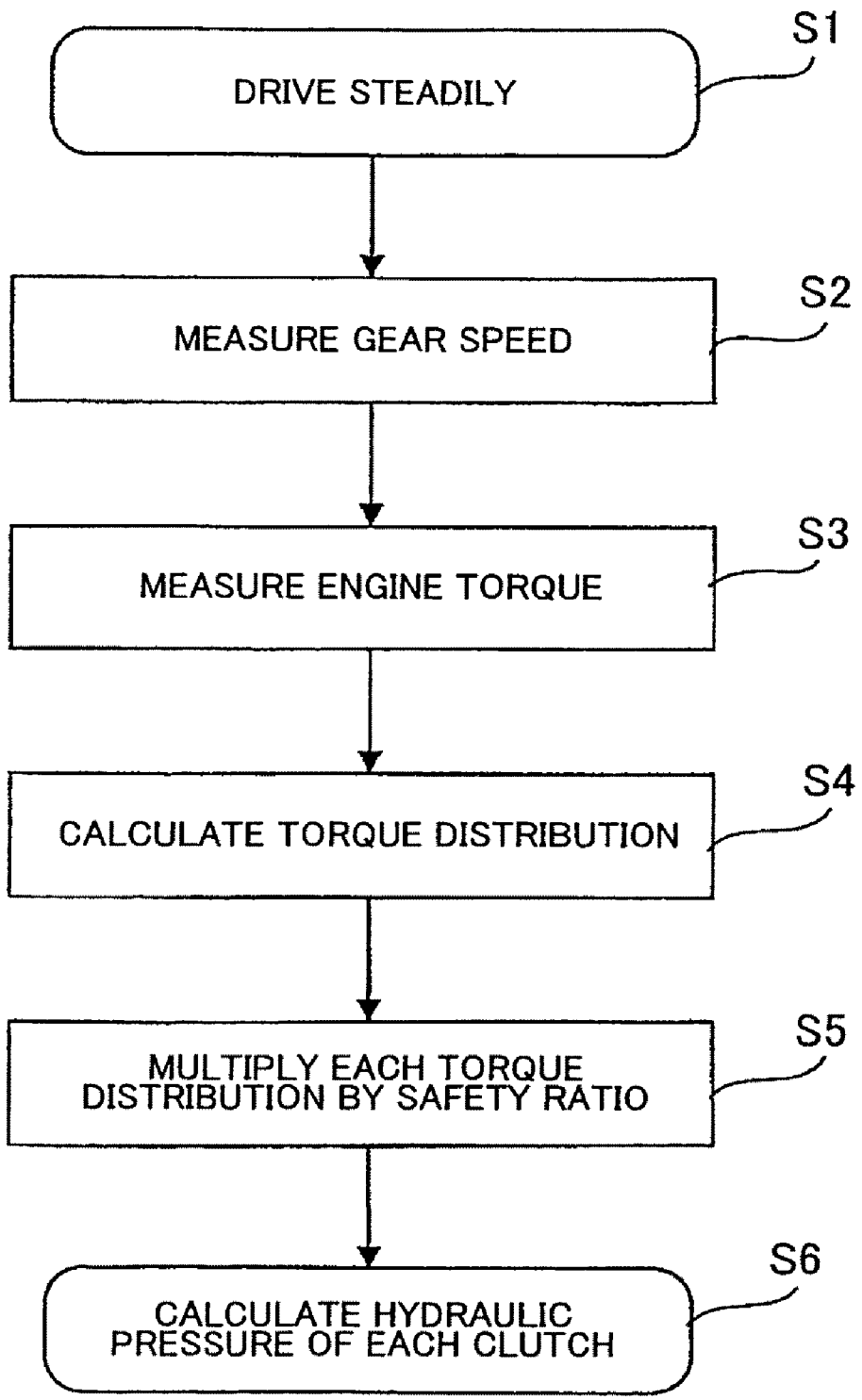
FIG. 6 is a flowchart showing a calculation method of an engagement pressure in a normal state.

Next, the normal state hydraulic pressure setting unit 72 multiplies the torque distribution of the clutch or brake engaged in accordance with the shift speed determined by the torque distribution determination unit 74 by a safety ratio (for example, 1.1 to 1.3 times set in accordance with the variation and the like of each part) (step S5 of FIG. 6), further multiplies the value of the torque distribution multiplied by the safety ratio by the input torque detected by the input torque detection unit 73 to calculate the torque capacity (transmission torque) of the engaged clutch or brake, and calculates the engagement pressure (control pressure) supplied to the hydraulic servo of the engaged clutch or brake from the number of friction plates, the area, the pressure receiving area of the hydraulic servo, and the like of each clutch or brake (step S6 of FIG. 6).

Based on the engagement pressure set by the normal state hydraulic pressure setting unit 72, the hydraulic pressure command unit 71 gives the electric command to the linear solenoid valves SLC1, SLC2, SLC3, and SLB1 to supply the engagement pressure to the hydraulic servo of the engaged clutch of brake. That is, while driving in the normal state, the clutch or brake is engaged such that the safety ratio is taken into consideration in addition to the input torque for the torque capacity, and such that the clutch or brake is prevented from slipping even if the engine torque of the engine 2 fluctuates or the torque fluctuation is received from the drive wheel due to the road situation or the like in particular.

Next, the change in torque distribution which occurs by the simultaneous engagement of three friction engagement elements in the case where a failure has occurred in a state where one of the linear solenoid valves SLC1, SLC2, SLC3, and SLB1 supplying the engagement pressure to the hydraulic servo of the released clutch or brake while driving in the normal state outputs the maximum pressure, i.e., in a state where the same pressure as the line pressure $P_L$ is output, will be described as an example taking a case (fifth failure case Fa5 of FIG. 7) where the clutch C-3 is engaged in the state of the fourth forward speed.

Figure 8A:
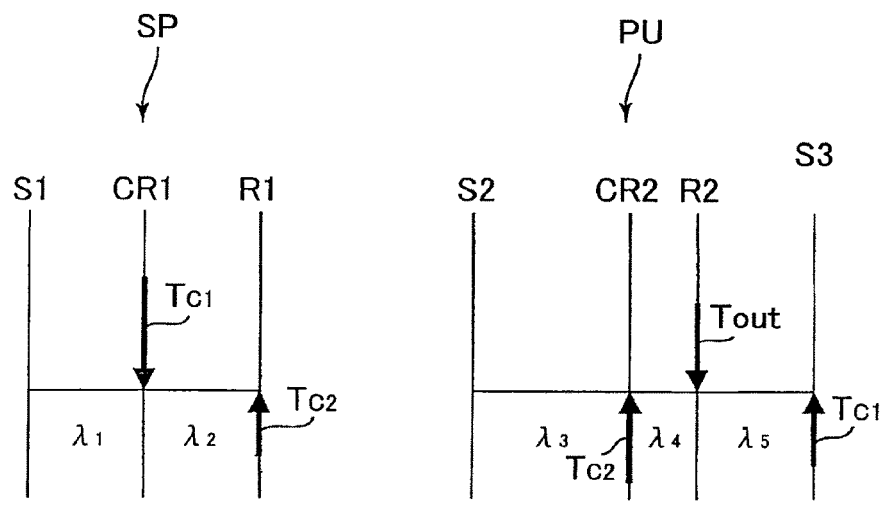
FIGS. 8A and 8B are illustrative views of one example of torque application in the normal state and in the failure state, FIG. 8A showing the torque application in a fourth forward speed in the normal state, and FIG. 8B showing the torque application in the failure state where a clutch C-3 is engaged in the fourth forward speed.

For example, the clutch C-1 and the clutch C-2 are engaged while driving in the fourth forward speed in the normal state, as shown in FIG. 3, and the state of torque application in the automatic speed change mechanism 5 is as shown in FIG. 8A. That is, the relational expression of balanced force in the planetary gear unit PU is as follows.

$$T\text{out} = T_{C1} + T_{C2} \quad (1)$$

The relational expression of balanced moment in the planetary gear unit PU is as follows.

$$T_{C2} \cdot \lambda 3 + T_{C1} \cdot (\lambda 3 + \lambda 4 + \lambda 5) = T\text{out} \cdot (\lambda 3 + \lambda 4) \quad (2)$$

Figure 8B:
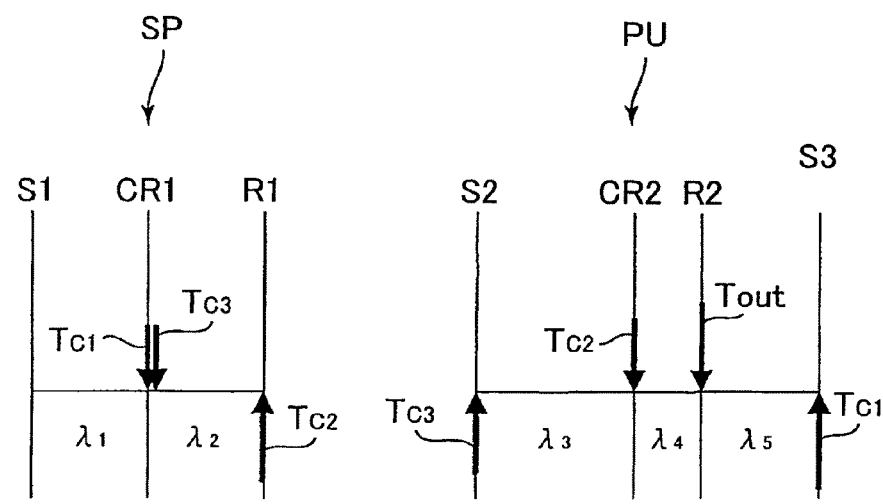

Note that, as shown in FIGS. 8A and 8B, $\lambda 1$ is the gear ratio of the sun gear S1 and the carrier CR1, $\lambda 2$ is the gear ratio of the carrier CR1 and the ring gear R1, $\lambda 3$ is the gear ratio of the sun gear S2 and the carrier CR2, $\lambda 4$ is the gear ratio of the carrier CR2 and the ring gear R2, and $\lambda 5$ is the gear ratio of the ring gear R2 and the sun gear S3.

For example, when a failure occurs in a state where the linear solenoid valve SLC3 outputs the control pressure $P_{SLC3}$ at the line pressure $P_L$, the simultaneous engagement of the clutch C-1, the clutch C-2, and the clutch C-3 occurs. At this time, a force which attempts to stall the automatic speed change mechanism 5 is generated, and a force which attempts to rotate the automatic speed change mechanism 5 with the driving force of the engine 2, and a force which attempts to rotate the automatic speed change mechanism 5 with the grip force of the drive wheel (inertia force of the vehicle) are generated. The state of the torque application when the driving force (i.e., input torque) of the engine 2 is zero and the automatic speed change mechanism 5 is attempted to be rotated only by the grip force from the drive wheel as the worst condition is shown in FIG. 8B. That is, the relational expression of balanced force is as follows.

$$T\text{out}+T_{C2}=T_{C1}+T_{C3} \quad (3)$$

The relational expression of balanced moment in the planetary gear SP is as follows.

$$(T_{C1}+T_{C3})\cdot\lambda 1=T_{C2}\cdot(\lambda 1+\lambda 2) \quad (4)$$

The relational expression of balanced moment in the planetary gear unit PU is as follows.

$$T_{C3}\cdot\lambda 3=T\text{out}\cdot\lambda 4-T_{C1}\cdot(\lambda 4+\lambda 5) \quad (5)$$

Note that, since the input torque is assumed to be zero, the torque application of the clutch C-2 is in the opposite direction as a reaction force with respect to the rotational force from the drive wheel.

From the expressions (3), (4), and (5), a value in which the torque capacity $T_{C1}$ of the clutch C-1 is converted to the output shaft torque Tout, a value in which the torque capacity $T_{C2}$ of the clutch C-2 is converted to the output shaft torque Tout, and a value in which the torque capacity $T_{C3}$ of the clutch C-3 is converted to the output shaft torque Tout can be obtained respectively. That is, the following is obtained by substitution of the expression (3) into the expression (4).

$$(T\text{out}+T_{C2})\cdot\lambda 1=T_{C2}\cdot(\lambda 1+\lambda 2)$$

Then, the following is obtained.

$$T_{C2}=(\lambda 1/\lambda 2)\cdot T\text{out} \quad (6)$$

The expression (5) is as follows.

$$T_{C1}\cdot(\lambda 4+\lambda 5)=T\text{out}\cdot\lambda 4-T_{C3}\cdot\lambda 3$$

$$T_{C1}=(T\text{out}\cdot\lambda 4-T_{C3}\cdot\lambda 3)/(\lambda 4+\lambda 5) \quad (5')$$

The following is obtained by substitution of the expression (5') and the expression (6) into the expression (3).

$$T\text{out}+(\lambda 1/\lambda 2)\cdot T\text{out}=(T\text{out}\cdot\lambda 4-T_{C3}\cdot\lambda 3)/(\lambda 4+\lambda 5)+T_{C3}$$

$$T_{C3}=[(\lambda 1\cdot\lambda 5+\lambda 2\cdot\lambda 5+\lambda 1\cdot\lambda 4)/\{\lambda 2(\lambda 4+\lambda 5-\lambda 3)\}]\cdot T\text{out} \quad (7)$$

The following is obtained by substitution of the expression (6) and the expression (7) into the expression (3).

$$T_{C1}=T\text{out}+(\lambda 1/\lambda 2)\cdot T\text{out}-[(\lambda 1\cdot\lambda 4+\lambda 2\cdot\lambda 5+\lambda 1\cdot\lambda 4)/\{\lambda 2\cdot(\lambda 4+\lambda 5-\lambda 3)\}]\cdot T\text{out}$$

$$T_{C1}=[1+(\lambda 1/\lambda 2)-(\lambda 1\cdot\lambda 5+\lambda 2\cdot\lambda 5+\lambda 1\cdot\lambda 4)/\{\lambda 2\cdot(\lambda 4+\lambda 5-\lambda 3)\}]\cdot T\text{out} \quad (8)$$

For example, assuming that the engine torque is at the maximum value in the fourth forward speed (assuming that the input torque is at the maximum value), and that $T_{C1}$ is the value obtained by multiplying the torque capacity of the clutch C-1 in the normal state by the safety ratio, $T_{C2}$ is the value obtained by multiplying the torque capacity of the clutch C-2 in the normal state by the safety ratio, and $T_{C3}$ is the value of the torque capacity in the case where the line pressure $P_L$ is supplied to the hydraulic servo 43 of the clutch C-3, the values in which the torque capacities of the respective clutches C-1, C-2, and C-3 when a failure has occurred in the worst condition are converted to the output shaft torques can be calculated by substituting the gear ratios λ1, λ2, λ3, λ4, and λ5 into the expressions (6), (7), and (8).

Figure 7:
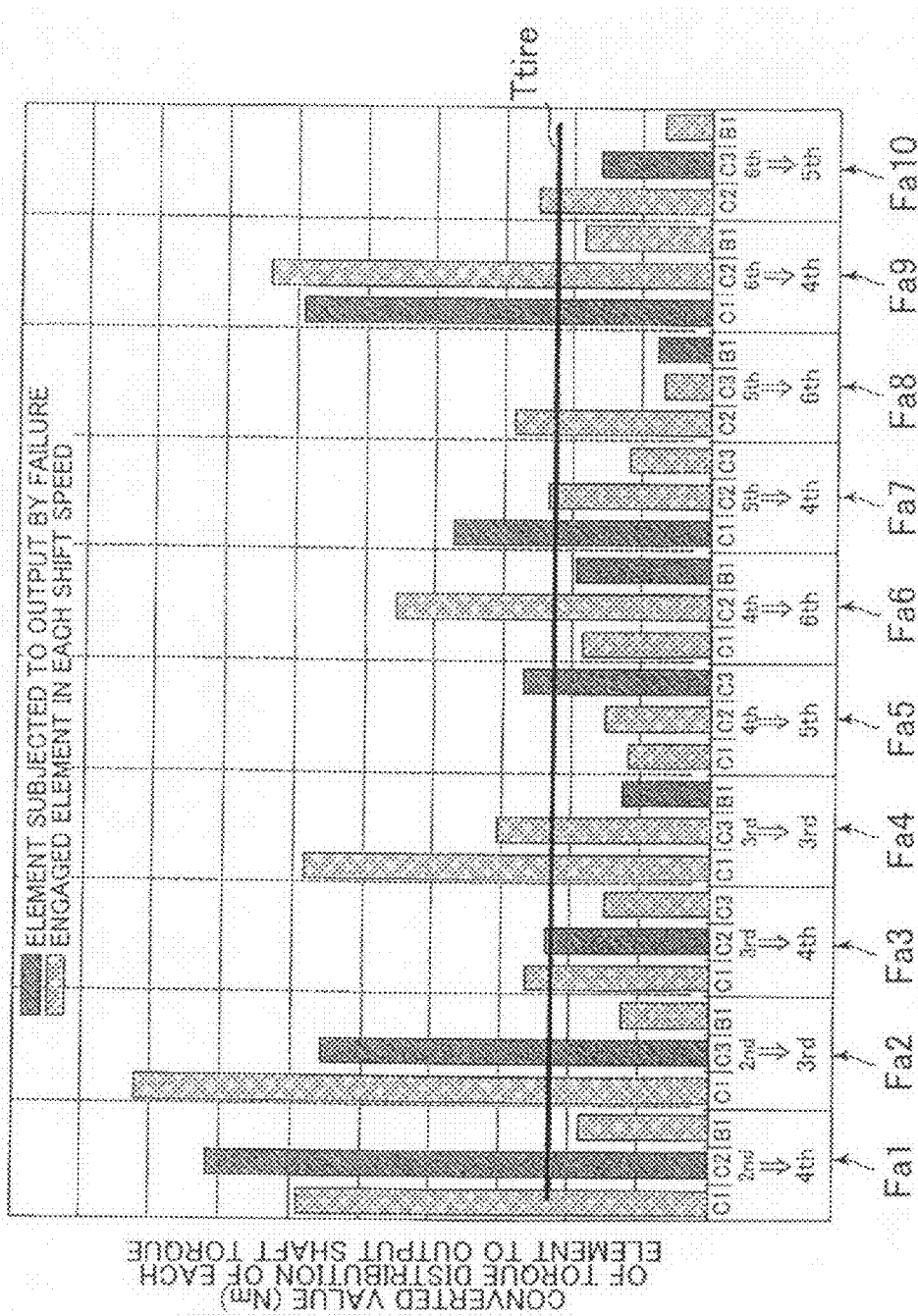
FIG. 7 is a view showing a torque capacity of each friction engagement element with respect to a drive wheel in a failure state.

The calculation result is the fifth failure case Fa5 shown in FIG. 7. That is, even in the worst condition where the linear solenoid valve SLC3 has failed to engage the clutch C-3 at the line pressure $P_L$ and the accelerator is released to bring the engine torque (input torque) to zero while driving in the fourth forward speed with the throttle of the engine 2 fully opened, the converted value of the clutch C-1 with respect to the output shaft torque and the converted value of the clutch C-2 with respect to the output shaft torque become less than a limit torque Ttire at which the drive wheel slips.

Therefore, the clutch C-1 of which the converted value with respect to the output shaft torque becomes minimum (in other words, the clutch C-1 in which the torque received from the output shaft (drive wheel) becomes maximum) is caused to slip based on the inertia force of the vehicle received from the drive wheel without the drive wheel slipping. Thus, the clutch C-2 and the clutch C-3 are in the engaged states without the three clutches C-1, C-2, and C-3 engaging simultaneously, i.e., in the state of the fifth forward speed, to ensure the driving state without being brought to a stalled state.

That is, in the fourth forward speed in the normal state, the clutches C-1 and C-2 are not engaged at the line pressure $P_L$, but are engaged by the normal state hydraulic pressure setting unit 72 at the engagement pressures $P_{C1}$ and $P_{C2}$, which are hydraulic pressures as low as possible, in consideration of the safety ratio so as not to slip due to the input torque. Thus, based on the change of the torque distribution by the clutch C-3 engaging at the time of failure, the clutch C-1 is set to slip even at the time of the failure. Accordingly, the stalled state can be prevented even if the failure occurs.

An example of the fifth failure case Fa5 as a case where the clutch C-3 is engaged due to a failure in the fourth forward speed has been described above. FIG. 7 shows states of a first failure case Fa1 to a fourth failure case Fa4 and a sixth failure case Fa6 to a tenth failure case Fa10 covering all possible failure cases when the torque distribution is calculated in a similar manner.

That is, in the first failure case Fa1 as a case where the clutch C-2 is engaged due to a failure of the linear solenoid valve SLC2 in the worst condition in the second forward speed, the converted value of the brake B-1 with respect to the output shaft torque becomes less than the limit torque Ttire at which the drive wheel slips based on the change of the torque distribution due to the failure. Thus, the clutches C-1 and C-2 are in the engaged states, i.e., in the state of the fourth forward speed, and the driving state is ensured without being brought to the stalled state.

In the second failure case Fa2 as a case where the clutch C-3 is engaged due to a failure of the linear solenoid valve SLC3 in the worst condition in the second forward speed, the converted value of the brake B-1 with respect to the output shaft torque becomes less than the limit torque Ttire at which the drive wheel slips based on the change of the torque distribution due to the failure. Thus, the clutches C-1 and C-3 are in the engaged states, i.e., in the state of the third forward speed, and the driving state is ensured without being brought to the stalled state.

In the third failure case Fa3 as a case where the clutch C-2 is engaged due to a failure of the linear solenoid valve SLC2 in the worst condition in the third forward speed, the converted value of the clutch C-3 with respect to the output shaft torque becomes less than the limit torque Ttire at which the drive wheel slips based on the change of the torque distribution due to the failure. Thus, the clutches C-1 and C-2 are in the engaged states, i.e., in the state of the fourth forward speed, and the driving state is ensured without being brought to the stalled state.

In the fourth failure case Fa4 as a case where the brake B-1 is engaged due to a failure of the linear solenoid valve SLB1 in the worst condition in the third forward speed, the converted value of the brake B-1 with respect to the output shaft torque becomes less than the limit torque Ttire at which the drive wheel slips based on the change of the torque distribution due to the failure. Thus, the clutches C-1 and C-3 are in the engaged states, i.e., in the state of the third forward speed, and the driving state is ensured without being brought to the stalled state. Note that, in the fourth failure case Fa4, the line pressure $P_L$ is supplied to the hydraulic servo 44 of the brake B-1. Since the winding direction of the brake band of the brake B-1 is opposite to the rotational direction of the drum-shaped member 18 as described above, i.e., the brake B-1 is rotated in a releasing direction by the rotation of the drive wheel, the converted value of the brake B-1 with respect to the output shaft torque becomes particularly small.

In the sixth failure case Fa6 as a case where the brake B-1 is engaged due to a failure of the linear solenoid valve SLB1 in the worst condition in the fourth forward speed, the converted value of the clutch C-1 with respect to the output shaft torque becomes less than the limit torque Ttire at which the drive wheel slips based on the change of the torque distribution due to the failure. Thus, the clutch C-2 and the brake B-1 are in the engaged states, i.e., in the state of the sixth forward speed, and the driving state is ensured without being brought to the stalled state.

In the seventh failure case Fa7 as a case where the clutch C-1 is engaged due to a failure of the linear solenoid valve SLC1 in the worst condition in the fifth forward speed, the converted value of the clutch C-3 with respect to the output shaft torque becomes less than the limit torque Ttire at which the drive wheel slips based on the change of the torque distribution due to the failure. Thus, the clutches C-1 and C-2 are in the engaged states, i.e., in the state of the fourth forward speed, and the driving state is ensured without being brought to the stalled state.

In the eighth failure case Fa8 as a case where the brake B-1 is engaged due to a failure of the linear solenoid valve SLB1 in the worst condition in the fifth forward speed, the converted value of the clutch C-3 with respect to the output shaft torque becomes less than the limit torque Ttire at which the drive wheel slips based on the change of the torque distribution due to the failure. Thus, the clutch C-2 and the brake B-1 are in the engaged states, i.e., in the state of the sixth forward speed, and the driving state is ensured without being brought to the stalled state.

In the ninth failure case Fa9 as a case where the clutch C-1 is engaged due to a failure of the linear solenoid valve SLC1 in the worst condition in the sixth forward speed, the converted value of the brake B-1 with respect to the output shaft torque becomes less than the limit torque Ttire at which the drive wheel slips based on the change of the torque distribution due to the failure. Thus, the clutches C-1 and C-2 are in the engaged states, i.e., in the state of the fourth forward speed, and the driving state is ensured without being brought to the stalled state.

In the tenth failure case Fa10 as a case where the clutch C-3 is engaged due to a failure of the linear solenoid valve SLC3 in the worst condition in the sixth forward speed, the converted value of the brake B-1 with respect to the output shaft torque becomes less than the limit torque Ttire at which the drive wheel slips based on the change of the torque distribution due to the failure. Thus, the clutches C-2 and C-3 are in the engaged states, i.e., in the state of the fifth forward speed, and the driving state is ensured without being brought to the stalled state.

Note that, as described above, since the engagement pressure $P_{B2}$ supplied to the brake B-2 is the control pressure $P_{SLC2}$ of the linear solenoid valve SLC2, and is switched by the C-2 relay valve 23 to be supplied to the hydraulic servo 45, the control pressure $P_{SLC2}$ is supplied to the hydraulic servo 42 in the case where the linear solenoid valve SLC2 has failed. That is, the brake B-2 cannot be caused to engage by a failure. Even if another clutch C-2 or C-3 or the brake B-1 is engaged in the first forward speed, the shift speed merely changes without the simultaneous engagement of the three friction engagement elements. Therefore, the first to tenth failure cases Fa1 to Fa10 cover all possible single failures in which one linear solenoid valve fails.

Even if the first to tenth failure cases Fa1 to Fa10 occur as described above, merely a downshift of two speeds from the sixth forward speed to the fourth forward speed occurs in the ninth failure case Fa9, and merely an upshift or a downshift of one speed occurs in other failure cases. Therefore, the driving stability of the vehicle is not greatly influenced by the failure in particular.

As described above, according to the present invention, the normal state hydraulic pressure setting unit 72 sets the engagement pressure of two friction engagement elements such that slippage does not occur in the two friction engagement elements in a state where a shift speed is formed by the engagement of the two friction engagement elements (clutch or brake) and such that at least one of three friction engagement elements is caused to slip even if another friction engagement element engages based on the line pressure $P_L$ while the two friction engagement elements are engaged. Therefore, the torque transmission can be performed between the driving source and the drive wheel without causing slippage of the friction engagement element while driving in the shift speed formed by the engagement of the two friction engagement elements, and the driving state can be ensured by one of the three friction engagement elements being caused to slip when another friction engagement element is engaged. Accordingly, provision of a cut-off valve becomes unnecessary to achieve a reduction in size, weight, and cost of the hydraulic control device.

The normal state hydraulic pressure setting unit 72 sets each engagement pressure such that the torque capacities of the two friction engagement elements forming the shift speed become torque capacities in which the safety ratios are taken into consideration in addition to the calculated transmission torques of the two friction engagement elements. Therefore, even if the torque fluctuates while driving in the shift speed formed by the engagement of the two friction engagement elements, the two friction engagement elements can reliably be prevented from slipping.

Further, since one of the three friction engagement elements is caused to slip by the inertia force of the vehicle, one of the three friction engagement elements can be reliably caused to slip without controlling the engine or the like in particular.

Specifically, when another friction engagement element engages while the two friction engagement elements are engaged, the torque distribution of the three friction engagement elements changes and one of the three friction engagement elements is applied with less than the limit torque Ttire at which the drive wheel slips. As a result, the one friction engagement element is caused to slip. Therefore, one of the three friction engagement elements can reliably be caused to slip.

Since the automatic speed change mechanism is brought to one of the shift speeds when another friction engagement element engages while the two friction engagement elements are engaged and one of the three friction engagement elements is caused to slip, the driving state can be ensured.

Particularly in the configuration of the automatic speed change mechanism 5, even if the line pressure $P_L$ is supplied to the hydraulic servo of another friction engagement element in the state where two friction engagement elements (clutch or brake) are engaged in the second forward speed to the sixth forward speed, the change of the torque distribution of the three friction engagement elements due to the simultaneous engagement of the three friction engagement elements causes the friction engagement element of which the torque distribution converted to the output shaft torque becomes minimum (the torque received from the drive wheel becomes maximum) to have a torque capacity, with respect to the drive wheel, of less than the inertia force of the vehicle (to receive a torque greater than the torque capacity of the hydraulic pressure setting in the normal state from the drive wheel) so as to slip. Accordingly, the driving state can be ensured. Since the engagement of the clutch C-1 and the locking of the one-way clutch F-1 achieve the first forward speed, the engagement of another friction engagement element merely causes a shift to one of the shift speeds, and the driving state can be ensured.

The brake B-1 is formed of the band brake, and the band brake is arranged such that the rotational direction of the drum-shaped member 18 in the second forward speed to the sixth forward speed is the opposite direction of the winding direction of the brake band 19. Therefore, the brake B-1 can be made to easily slip by the inertia force of the vehicle even if the line pressure $P_L$ is supplied to the hydraulic servo 44 of the brake B-1. Accordingly, particularly in the configuration of the automatic speed change mechanism 5, one friction engagement element can be reliably caused to slip even if another friction engagement element is engaged in the state of any of the shift speeds.

Further, by a configuration in which the linear solenoid valves SLC1, SLC2, SLC3, and SLB1 supply the control pressures $P_{SLC1}$, $P_{SLC2}$, $P_{SLC3}$, and $P_{SLB1}$ as the engagement pressures $P_{C1}$, $P_{C2}$, $P_{C3}$, and $P_{B1}$ in correspondence with the respective hydraulic servos 41, 42, 43, and 44 as in the hydraulic control device 6, the torque capacity (hydraulic pressure setting) of each friction engagement element can be set individually, and the torque capacity of each friction engagement element can be set such that two friction engagement elements do not slip while forming a shift speed and one friction engagement element slips when another friction engagement element is engaged.

Further, the brake B-2 is arranged in parallel with the one-way clutch F-1 and is formed of a brake which stops the rotation of the carrier CR2 during coasting in the first forward speed, and the C-2 relay valve 23 switches the hydraulic servo 42 of the clutch C-2 and the hydraulic servo 45 of the brake B-2 to supply the control pressure $P_{SLC2}$ regulated by the linear solenoid valve SLC2. Therefore, a particularly small torque capacity suffices for the brake B-2 during coasting in the first forward speed. Furthermore, the brake B-2 is not engaged even if the linear solenoid valve SLC2 outputs the control pressure $P_{SLC2}$ in the shift speed other than the coasting in the first forward speed. Therefore, one friction engagement element can be reliably caused to slip even if another friction engagement element is engaged in the state of any of the shift speeds.

Note that, in the embodiment described above, when setting the hydraulic pressure of the friction engagement element to be engaged in the normal state, the torque capacity is set to a value obtained by multiplying the torque capacity based on the torque distribution and the input torque by the safety ratio. However, the safety ratio is to be set to an appropriate value in consideration of the output performance of the driving source (engine), and the grip performance of the drive wheel, for example. That is, as long as the hydraulic pressure setting in the normal state is performed such that slippage does not occur in two friction engagement elements forming a shift speed and such that one of the friction engagement elements slips when another friction engagement element is engaged, the safety ratio may take any value. Further, any method may be used as a calculation method of the hydraulic pressure setting in the normal state.

The automatic transmission 3 of the embodiment described above has been described as one example that can achieve the sixth forward speed. However, the present invention is obviously not limited thereto, and may be applied to any automatic transmission, as long as the hydraulic pressure setting of the automatic transmission in the normal state as described above can cause two friction engagement elements to not slip when the two friction engagement elements form a shift speed and cause one of three friction engagement elements to slip when another friction engagement element engages to prevent a simultaneous engagement.

The control device for an automatic transmission according to the present invention can be used for an automatic transmission mounted on a passenger car, a truck, a bus, or an agricultural machine, for example, and is particularly suitable for use in an automatic transmission which can ensure the driving state even if three friction engagement elements are simultaneously engaged and which is required to be reduced in size, weight and cost.

According to an exemplary aspect of the invention, the controller sets the engagement pressure of the two friction engagement elements such that slippage does not occur in the two friction engagement elements in the state where the engagement of the two friction engagement elements forms the shift speeds and such that, even if an additional friction engagement element engages based on the line pressure while the two friction engagement elements are engaged, one of the three friction engagement elements is caused to slip. Therefore, the torque transmission between the driving source and the drive wheel can be performed without causing slippage in the friction engagement elements while driving in the shift speeds formed by the engagement of the two friction engagement elements, and the driving state can be ensured by causing one of the three friction engagement elements to slip when an additional friction engagement element engages. Accordingly, provision of a cut-off valve can be made unnecessary, and a hydraulic control device can be reduced in size, weight, and cost.

According to an exemplary aspect of the invention, the controller sets the engagement pressure such that the torque capacity of the two friction engagement elements becomes the torque capacity in which the safety ratio is taken into consideration in addition to the calculated transmission torque of the two friction engagement elements. Therefore, slippage in the two friction engagement elements can reliably be prevented even if the torque fluctuates while driving in the shift speeds formed by the engagement of the two friction engagement elements.

According to an exemplary aspect of the invention, since one of the three friction engagement elements is caused to slip by the inertia force of the vehicle, one of the three friction engagement elements can reliably be caused to slip without controlling the driving source or the like in particular.

According to an exemplary aspect of the invention, the torque distribution of the three friction engagement elements changes when an additional friction engagement element engages while the two friction engagement elements are engaged and one of the three friction engagement elements is applied with less than the limit torque at which the drive wheel slips to cause slippage in the one friction engagement element. Therefore, one of the three friction engagement elements can reliably be caused to slip.

According to an exemplary aspect of the invention, the automatic speed change mechanism is brought to one of the shift speeds when an additional friction engagement element engages while the two friction engagement elements are engaged and slippage is caused in one of the three friction engagement elements. Thus, the driving state can be ensured.

According to an exemplary aspect of the invention, even if the line pressure is supplied to the hydraulic servo of an additional friction engagement element in a state where two friction engagement elements (clutch or brake) are engaged in the second forward speed to the sixth forward speed in particular, the change of the torque distribution of the three friction engagement elements due to the simultaneous engagement of the three friction engagement elements causes the friction engagement element of which the torque distribution converted to the output shaft torque becomes minimum (the torque received from the drive wheel becomes maximum) to have a torque capacity with respect to the drive wheel of less than the inertia force of the vehicle (to receive a torque greater than the torque capacity of the hydraulic pressure setting in the normal state from the drive wheel) so as to slip. Accordingly, the driving state can be ensured. Since the engagement of the first clutch and the locking of the one-way clutch achieve the first forward speed, the engagement of an additional friction engagement element merely causes a shift to one of the shift speeds, and the driving state can be ensured.

According to an exemplary aspect of the invention, the first brake is formed of the band brake, and the band brake is arranged such that the rotational direction of the drum-shaped member in the second forward speed to the sixth forward speed is the opposite direction of the winding direction of the brake band. Therefore, the first brake can be made to easily slip by the inertia force of the vehicle even if the line pressure is supplied to the hydraulic servo of the first brake. Accordingly, particularly in the structure of the automatic speed change mechanism, one friction engagement element can reliably be caused to slip even if an additional friction engagement element engages in the state of any of the shift speeds.

According to an exemplary aspect of the invention, with a configuration in which the first, second, third, and fourth solenoid valves supply the engagement pressures in correspondence with the respective hydraulic servos, the torque capacity (hydraulic pressure setting) of each friction engagement element can be set individually. Thus, the torque capacity of each friction engagement element can be set such that the two friction engagement elements do not slip while forming a shift speed and one friction engagement element slips when an additional friction engagement element engages.

According to an exemplary aspect of the invention, the second brake is arranged in parallel with the one-way clutch and is formed of the brake which stops the rotation of the second rotational element during coasting in the first forward speed, and the switching portion switches the hydraulic servo of the second clutch and the hydraulic servo of the second brake to supply the engagement pressure regulated by the second solenoid valve. Therefore, a small torque capacity suffices in particular for the second brake during coasting in the first forward speed. Since the second brake is not engaged even if the second solenoid valve outputs the engagement pressure in a shift speed other than the coasting in the first forward speed, one friction engagement element can be reliably caused to slip even if an additional friction engagement element engages in the state of any of the shift speeds.

What is claimed is:

1. A control device for an automatic transmission that includes an automatic speed change mechanism with an input shaft connected to a driving source and an output shaft connected to a drive wheel and a plurality of friction engagement elements engaged based on an engagement pressure supplied to each hydraulic servo, in which a transmission path between the input shaft and the output shaft is changed based on engaged states of two of the plurality of friction engagement elements to form a plurality of shift speeds; and a regulated pressure supply portion that can freely regulate a line pressure to be supplied as the engagement pressure individually to each of the hydraulic servos, and which selectively engages the friction engagement elements in accordance with the shift speeds, the control device comprising:
   an input torque detection unit that detects an input torque input to the input shaft; and
   a controller that:
      determines torque distribution of two friction engagement elements that form the shift speeds; and
      calculates a transmission torque of the two friction engagement elements based on the input torque and the torque distribution and sets the engagement pressure to obtain a torque capacity that can transmit the transmission torque,
   wherein the controller sets the engagement pressure such that when a third friction engagement element engages based on the line pressure while two friction engagement elements are engaged in a normal state to form a shift speed, one of the three friction engagement elements is caused to slip while two of the three friction engagement elements do not slip.

2. The control device for the automatic transmission according to claim 1, wherein the controller sets the engagement pressure such that a torque capacity of the two friction engagement elements becomes a torque capacity in which a safety ratio is taken into consideration in addition to the calculated transmission torque of the two friction engagement elements.

3. The control device for the automatic transmission according to claim 1, wherein the one of the three friction engagement elements is caused to slip by an inertia force of a vehicle.

4. The control device for the automatic transmission according to claim 1, wherein torque distribution of the three friction engagement elements changes when the third friction engagement element engages while the two friction engagement elements are engaged, and the one of the three friction engagement elements is applied with less than a limit torque at which the drive wheel slips to cause slippage in the one of the three friction engagement elements.

5. The control device for the automatic transmission according to claim 1, wherein the automatic speed change mechanism is brought to a state of one of the plurality of shift speeds when the third friction engagement element engages while the two friction engagement elements are engaged and slippage is caused in the one of the three friction engagement elements.

6. The control device for the automatic transmission according to claim 1, wherein the automatic transmission includes:
   a deceleration planetary gear that decelerates a rotation of the input shaft;
   a planetary gear set that includes first, second, third, and fourth rotational elements, the fourth rotational element being connected to the drive wheel;
   a first clutch that enables transmission of decelerated rotation of the deceleration planetary gear to the first rotational element;
   a second clutch that enables transmission of the rotation of the input shaft to the second rotational element;

a third clutch that enables transmission of the decelerated rotation of the deceleration planetary gear to the third rotational element;

a first brake that enables stoppage of rotation of the third rotational element; and a one-way clutch that can stop rotation of the second rotational element in one direction, the first clutch and the one-way clutch being engaged in a first forward speed;

the first clutch and the first brake being engaged in a second forward speed;

the first clutch and the third clutch being engaged in a third forward speed;

the first clutch and the second clutch being engaged in a fourth forward speed;

the second clutch and the third clutch being engaged in a fifth forward speed; and the second clutch and the first brake being engaged in a sixth forward speed.

7. The control device for the automatic transmission according to claim 6, wherein:

the first brake has one end fixed to a case and another end drive-connected to the hydraulic servo, and is formed of a band brake having a brake band that is wound around a drum-shaped member connected to the third rotational element by a drive of the hydraulic servo, and the band brake is arranged such that a rotational direction of the drum-shaped member in the second forward speed to the sixth forward speed is an opposite direction of a winding direction of the brake band.

8. The control device for the automatic transmission according to claim 6, wherein:

the regulated pressure supply portion includes four solenoid valves of first, second, third, and fourth solenoid valves, the engagement pressure regulated by the first solenoid valve is supplied to the hydraulic servo of the first clutch, the engagement pressure regulated by the second solenoid valve is supplied to the hydraulic servo of the second clutch, the engagement pressure regulated by the third solenoid valve is supplied to the hydraulic servo of the third clutch, and the engagement pressure regulated by the fourth solenoid valve is supplied to the hydraulic servo of the first brake.

9. The control device for the automatic transmission according to claim 8, further comprising:

a second brake that is arranged in parallel with the one-way clutch and that stops the rotation of the second rotational element during coasting in the first forward speed; and a switching portion that switches the hydraulic servo of the second clutch and the hydraulic servo of the second brake to supply the engagement pressure regulated by the second solenoid valve.

10. A method of operating an automatic transmission that includes an automatic speed change mechanism with an input shaft connected to a driving source and an output shaft connected to a drive wheel and a plurality of friction engagement elements engaged based on an engagement pressure supplied to each hydraulic servo, in which a transmission path between the input shaft and the output shaft is changed based on engaged states of two of the plurality of friction engagement elements to form a plurality of shift speeds; and a regulated pressure supply portion that can freely regulate a line pressure to be supplied as the engagement pressure individually to each of the hydraulic servos, and which selectively engages the friction engagement elements in accordance with the shift speeds, the method comprising:

detecting an input torque input to the input shaft with a detector;

determining torque distribution of two friction engagement elements that form the shift speeds with a controller; and calculating a transmission torque of the two friction engagement elements based on the input torque and the torque distribution and sets the engagement pressure to obtain a torque capacity that can transmit the transmission torque with a controller, wherein the engagement pressure is set such that when a third engagement element engages based on the line pressure while two friction engagement elements are engaged in a normal state to form a shift speed, one of the three friction engagement elements is caused to slip while two of the three friction engagement elements do not slip.

11. The method according to claim 10, wherein the engagement pressure is set such that a torque capacity of the two friction engagement elements becomes a torque capacity in which a safety ratio is taken into consideration in addition to the calculated transmission torque of the two friction engagement elements.

12. The method according to claim 10, wherein the one of the three friction engagement elements is caused to slip by an inertia force of a vehicle.

13. The method according to claim 10, wherein torque distribution of the three friction engagement elements changes when the third friction engagement element engages while the two friction engagement elements are engaged, and the one of the three friction engagement elements is applied with less than a limit torque at which the drive wheel slips to cause slippage in the one of the three friction engagement element.

14. The method according to claim 10, wherein the automatic speed change mechanism is brought to a state of one of the plurality of shift speeds when the third friction engagement element engages while the two friction engagement elements are engaged and slippage is caused in the one of the three friction engagement elements.

15. A non-transitory computer readable storage medium storing a set of program instructions for operating an automatic transmission that includes an automatic speed change mechanism with an input shaft connected to a driving source and an output shaft connected to a drive wheel and a plurality of friction engagement elements engaged based on an engagement pressure supplied to each hydraulic servo, in which a transmission path between the input shaft and the output shaft is changed based on engaged states of two of the plurality of friction engagement elements to form a plurality of shift speeds; and a regulated pressure supply portion that can freely regulate a line pressure to be supplied as the engagement pressure individually to each of the hydraulic servos, and that selectively engages the friction engagement elements in accordance with the shift speeds, the program comprising instructions for:

detecting an input torque input to the input shaft;

determining torque distribution of two friction engagement elements that form the shift speeds; and calculating a transmission torque of the two friction engagement elements based on the input torque and the torque distribution and sets the engagement pressure to obtain a torque capacity that can transmit the transmission torque, wherein the engagement pressure is set such that when a third friction engagement element engages based on the line pressure while two friction engagement elements are engaged in a normal state to form a shift speed, one of the three friction engagement elements is caused to slip while two of the three friction engagement elements do not slip.

16. The computer readable storage medium according to claim 15, wherein the engagement pressure is set such that a torque capacity of the two friction engagement elements becomes a torque capacity in which a safety ratio is taken into consideration in addition to the calculated transmission torque of the two friction engagement elements.

17. The computer readable storage medium according to claim 15, wherein the one of the three friction engagement elements is caused to slip by an inertia force of a vehicle.

18. The computer readable storage medium according to claim 15, wherein torque distribution of the three friction engagement elements changes when the third friction engagement element engages while the two friction engagement elements are engaged, and the one of the three friction engagement elements is applied with less than a limit torque at which the drive wheel slips to cause slippage in the one of the three friction engagement element.

19. The computer readable storage medium according to claim 15, wherein the automatic speed change mechanism is brought to a state of one of the plurality of shift speeds when the third friction engagement element engages while the two friction engagement elements are engaged and slippage is caused in the one of the three friction engagement elements.

* * * * *